United States Patent
Elson et al.

(10) Patent No.: US 10,143,043 B1
(45) Date of Patent: Nov. 27, 2018

(54) HEATED SEAT BELT

(71) Applicant: Ford Global Technologies, LLC, Dearborn, MI (US)

(72) Inventors: John Craig Elson, Bloomfield Township, MI (US); Kerrie Gath, Pittsfield, MI (US); Clay Wesley Maranville, Ypsilanti, MI (US); Victoria Schein, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/834,191

(22) Filed: Dec. 7, 2017

(51) Int. Cl.
*H05B 1/02* (2006.01)
*H05B 3/34* (2006.01)
*B60R 22/48* (2006.01)

(52) U.S. Cl.
CPC .............. *H05B 3/347* (2013.01); *B60R 22/48* (2013.01); *H05B 2203/005* (2013.01)

(58) Field of Classification Search
CPC .............. H05B 3/247; H05B 2203/005; H05B 2203/002; H05B 22/48; H05B 1/0236; H05B 1/0238; H05B 3/026; H05B 3/34; H05B 3/342
USPC ................ 219/202, 494, 528, 539, 541, 545
See application file for complete search history.

(56) References Cited

U.S. PATENT DOCUMENTS

| | | | |
|---|---|---|---|
| 3,306,662 A * | 2/1967 | Finnigan | B60R 22/00 297/482 |
| 4,565,991 A * | 1/1986 | Lupoli | B60R 16/0232 340/384.7 |
| 5,653,741 A | 8/1997 | Grant | |
| 5,727,814 A | 3/1998 | White | |
| 5,730,121 A | 3/1998 | Hawkins, Jr. et al. | |
| 6,630,414 B1 | 10/2003 | Matsumoto | |
| 6,737,610 B1 | 5/2004 | Horn et al. | |
| 7,788,952 B2 | 9/2010 | Morrison | |
| 7,977,608 B2 * | 7/2011 | Diemer | B60N 2/002 219/217 |
| 8,269,512 B2 * | 9/2012 | Ootaka | B60R 21/01532 297/217.3 |

(Continued)

FOREIGN PATENT DOCUMENTS

| | | | | |
|---|---|---|---|---|
| AT | 300591 | | 7/1972 | |
| DE | 102008034633 A1 | | 1/2010 | |
| FR | 2765834 | * | 1/1999 | ............. H05B 3/34 |
| JP | 2013226882 A | * | 2/2013 | ............. H05B 3/347 |
| JP | 2015039901 | * | 3/2015 | ............. H05B 3/347 |

OTHER PUBLICATIONS

U.S. Appl. No. 15/834,170, filed Dec. 7, 2017, entitled "Vehicle Seat Belt System Having Electrical Connector," (21 pages of specification and 22 pages of drawings) and filing receipt.

(Continued)

*Primary Examiner* — Mark Paschall
(74) *Attorney, Agent, or Firm* — Vichit Chea; Price Heneveld LLP

(57) ABSTRACT

A vehicle seat belt system is provided. The vehicle seat belt system includes a seat belt comprising a webbing, an electric powered device such as a heater coupled to the webbing, electrical circuitry connected to the heater and extending through a seat belt buckle and connector tongue, and an electric power source for providing electric power to the electric heater via the electrical circuitry. The electrical circuitry supplies power through the connector tongue and seat belt buckle.

20 Claims, 22 Drawing Sheets

(56) References Cited

U.S. PATENT DOCUMENTS

| | | |
|---|---|---|
| 8,876,580 B2 | 11/2014 | Castro |
| 9,204,493 B2* | 12/2015 | Yoshimoto ............ B60N 2/5685 |
| 9,346,430 B2 | 5/2016 | Wang et al. |
| 9,539,983 B2 | 1/2017 | Demeritte |
| 2003/0206834 A1 | 11/2003 | Chiao et al. |
| 2004/0262294 A1 | 12/2004 | Horey et al. |
| 2006/0208471 A1 | 9/2006 | Sundararajan et al. |
| 2011/0282637 A1 | 11/2011 | Yeh |
| 2012/0055914 A1* | 3/2012 | Goto .................... B60N 2/5685 219/217 |
| 2012/0242115 A1* | 9/2012 | Schreiber ................ B60N 2/24 297/180.12 |
| 2014/0080373 A1 | 3/2014 | Keitsch |
| 2014/0246415 A1* | 9/2014 | Wittkowski ......... B60N 2/5685 219/201 |
| 2016/0303943 A1 | 10/2016 | Arens et al. |

OTHER PUBLICATIONS

U.S. Appl. No. 15/834,217, filed Dec. 7, 2017, entitled "Vehicle Seat Belt System Having Uniform Air Delivery," (14 pages of specification and 8 pages of drawings) and filing receipt.

U.S. Appl. No. 15/834,247, filed Dec. 7, 2017, entitled "Vehicle Seat Belt System Having Air Distribution Manifold," (12 pages of specification and 5 pages of drawings) and filing receipt.

U.S. Appl. No. 15/834,266, filed Dec. 7, 2017, entitled "Vehicle Seat Belt Having Tubes for Air Delivery," (14 pages of specification and 6 pages of drawings) and filing receipt.

U.S. Appl. No. 15/653,602, filed Jul. 19, 2017, entitled "Tubular Seat Belt System Having Air Delivery," (13 pages of specification and 7 pages of drawings) and filing receipt.

U.S. Statutory Invention Registration No. H902, published Apr. 2, 1991, to Rousseau.

* cited by examiner

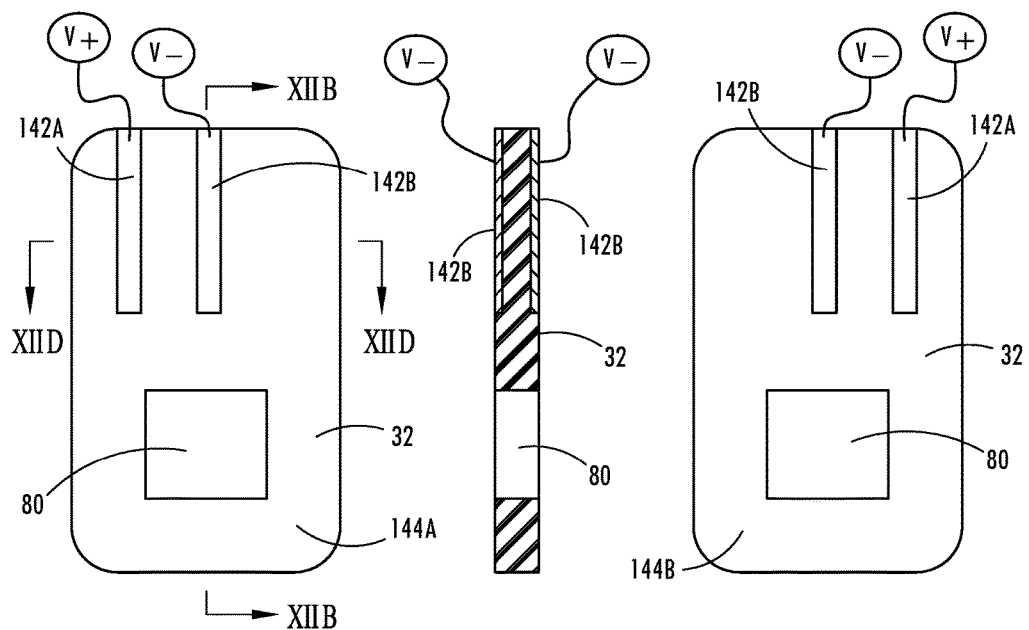
FIG. 12A  FIG. 12B  FIG. 12C
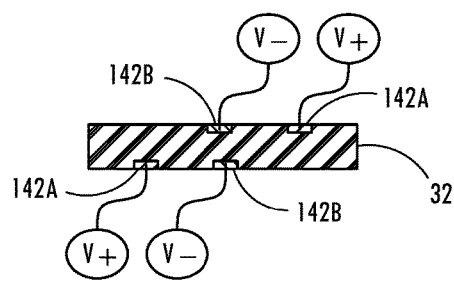
FIG. 12D

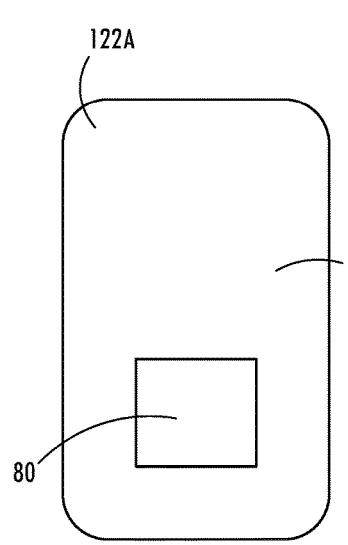 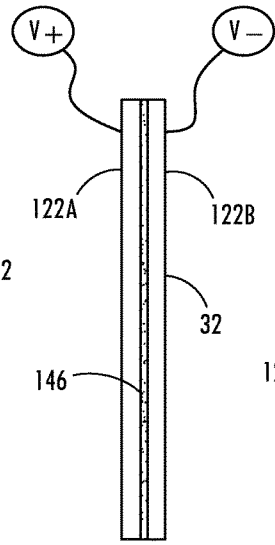 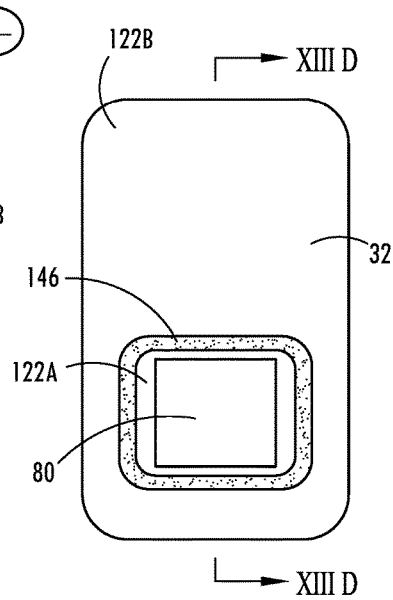
FIG. 13A  FIG. 13B  FIG. 13C
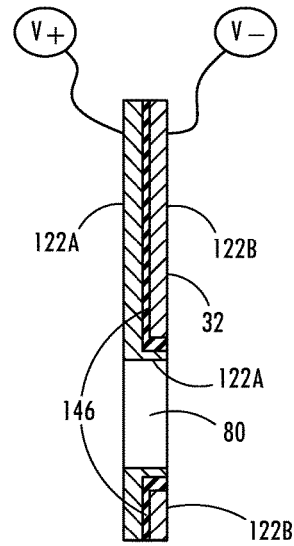
FIG. 13D

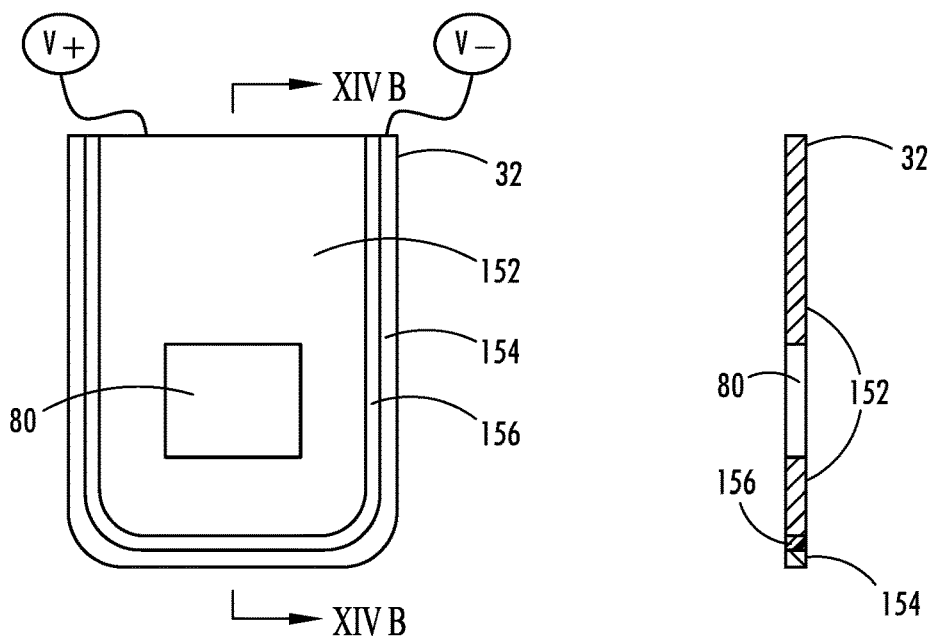
FIG. 14A  FIG. 14B
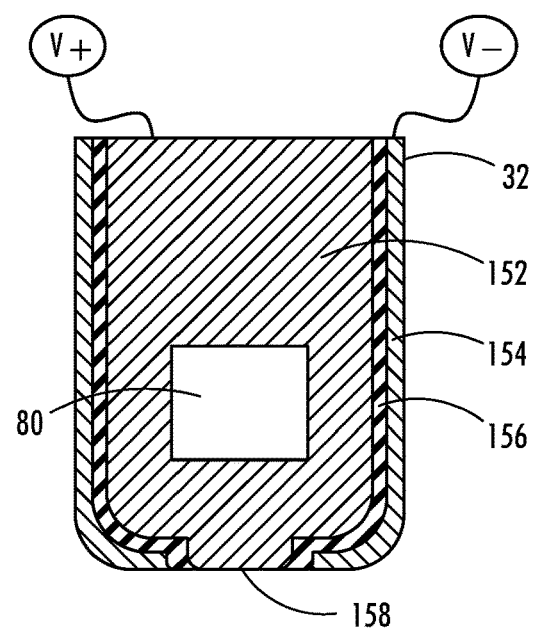
FIG. 15 ically related to seat belts having
HEATED SEAT BELT

FIELD OF THE INVENTION

The present invention generally relates to vehicle seat belts, and more particularly relates to seat belts having electric power and/or heaters.

BACKGROUND OF THE INVENTION

Automotive vehicles are typically equipped with seat belts for restraining passengers seated in vehicle seats. Conventional seat belts typically include a lap belt and a shoulder belt connected to a buckle which, in turn, connects to the vehicle structure, such as a seat or floor. The seat belt is typically made of a seat belt webbing that contacts the body of the seated passenger. It is desirable to provide for a seat belt system that provides enhanced heat control and/or power for the seated passenger(s).

SUMMARY OF THE INVENTION

According to one aspect of the present invention, a vehicle seat belt system is provided. The vehicle seat belt system includes a seat belt comprising a webbing, an electric powered heater coupled to the webbing, and a power source for providing electric power to the heater.

Embodiments of the first aspect of the invention can include any one or a combination of the following features:
- the seat belt system further includes electrical circuitry connecting the heater to an electric power source;
- the seat belt system further includes a seat belt buckle and connector tongue, wherein the electrical circuitry connects through a seat belt buckle and connector tongue;
- the electric heater comprises a resistance heating element sewn into the webbing;
- the sewn resistance heating element comprises a resistance wire sewn into the webbing and coupled in parallel between positive and negative bus bars;
- the resistance heating element comprises a resistance wire sewn into the webbing in series;
- the webbing comprises a tubular webbing defining a passageway, and wherein the heater is disposed within the passageway;
- the heater is connected to an outside surface of the webbing;
- the seat belt system further includes a dielectric and thermally conductive material disposed on top of the heater;
- the heater comprises a thermoelectric device;
- the webbing comprises a tubular webbing defining a passageway, wherein the thermoelectric device is disposed within the passageway; and
- the seat belt system further includes an air delivery device for delivering air to the passageway.

According to another aspect of the present invention, a vehicle seat belt system includes a seat belt comprising a webbing, an electric powered heater coupled to the webbing, electrical circuitry connected to the heater and extending through a seat belt buckle and connector tongue, and an electric power source for providing electric power to the electric heater via the electrical circuitry.

Embodiments of the second aspect of the invention can include any one or a combination of the following features:
- The electric heater includes a resistance heating element sewn into the webbing;
- the sewn resistance heating element comprises a resistance wire sewn into the webbing and coupled in parallel between positive and negative bus bars;
- the resistance heating element comprises a resistance wire sewn into the webbing in series;
- the webbing comprises a tubular webbing defining a passageway, and wherein the heater is disposed within the passageway;
- the heater is connected to an outside surface of the webbing;
- the heater comprises a thermoelectric device; and
- the webbing comprises a tubular webbing defining a passageway, wherein the thermoelectric device is disposed within the passageway.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 12A is a front view of the connector tongue having electrical power circuitry, according to a fifth embodiment;

FIG. 12B is a cross-sectional view taken through line XIIB-XIIB of FIG. 12A;

FIG. 12C is a rear view of connector tongue shown in FIG. 12A;

FIG. 12D is a cross-sectional view taken through line XIID-XIID of FIG. 12A;

FIG. 13A is a front view of a connector tongue having electrical circuitry according to a sixth embodiment;

FIG. 13B is a side view of the tongue shown in FIG. 13A;

FIG. 13C is a rear view of the tongue shown in FIG. 13A;

FIG. 13D is a cross-sectional view taken through line XIIID-XIIID of FIG. 13C:

FIG. 14A is a front view of a portion of a connector tongue having electrical power circuitry according to a seventh embodiment;

FIG. 14B is a cross-sectional view taken through line XIVB-XIVB of FIG. 14A;

FIG. 15 is a front view of a connector tongue having electrical power circuitry according to an eighth embodiment;

DETAILED DESCRIPTION OF THE PREFERRED EMBODIMENTS

As required, detailed embodiments of the present invention are disclosed herein; however, it is to be understood that the disclosed embodiments are merely exemplary of the invention that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present invention.

Figure 1:
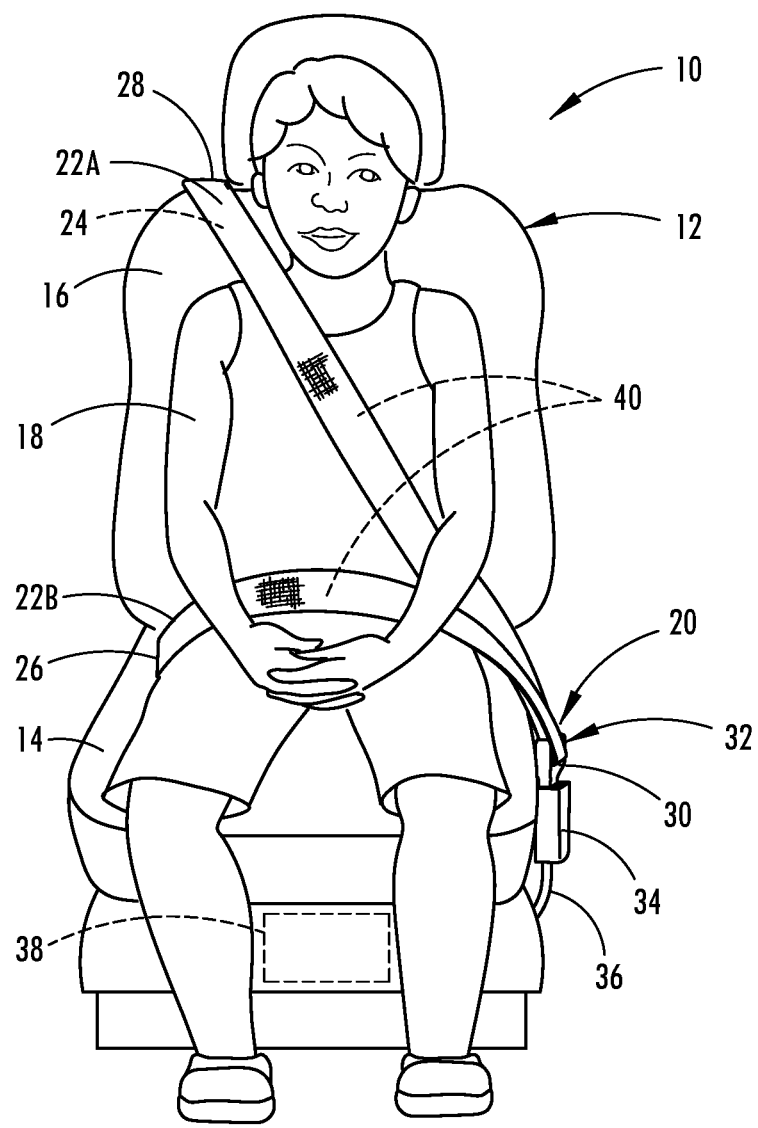
FIG. 1 is a perspective view of the passenger cabin of an automotive vehicle having a seat belt system restraining a passenger seated on a seat assembly and configured with an electric powered heater, according to one embodiment.
Figure 2:
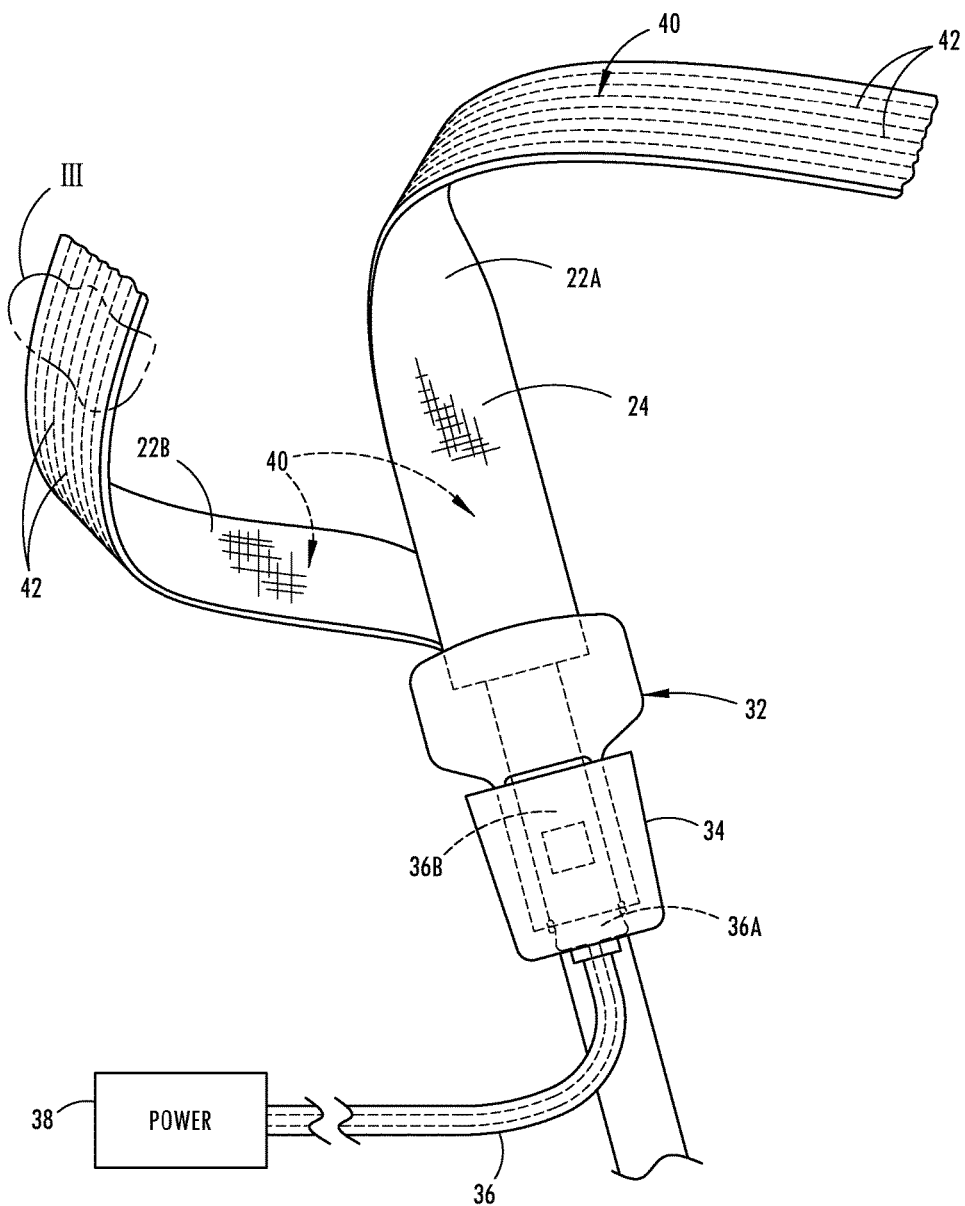
FIG. 2 is an enlarged side view of a portion of the seat assembly illustrating the heater made of resistance heating wire and an electric power supply coupled to the seat belt.

Referring now to FIG. 1, a portion of the passenger cabin or compartment of a vehicle 10 is generally illustrated having a seat belt system 20 assembled onto a seat assembly 12 and including an electric powered heater 40 on the seat belt webbing 24, according to one embodiment. The vehicle 10 may include a wheeled motor vehicle, such as a car, truck, van or any other type of vehicle that includes a seat belt system. The seat assembly 12 is generally illustrated including a lower seat 14 pivotally connected to an upper seat back 16 and configured to receive and retain a seated passenger 18. It should be appreciated that the vehicle 10 may include a plurality of seat assemblies 12 each including a seat belt system 20 as shown and described herein.

The seat belt system 20 is shown as a three-point seat belt configuration having a seat belt webbing 24 connected at a first connection point 28 generally near the top of the seat back 16 or another supporting portion within the vehicle such as the B-pillar, a second connection point 26 connected to the floor or the seat 14 of the vehicle generally in the region of the lap of the passenger seated on the seat 14, and a third connection point 30 shown connected to a connector tongue 32 which releasably connects or fastens to a seat belt buckle 34. The connector tongue 32 is matingly and releasably coupled to the seat belt buckle 34 for fastening the tongue 32 onto the buckle 34. The seat belt system 20 includes the seat belt comprising the seat belt webbing 24. The webbing 24 may be flat or may be generally in the shape of a flattened tube defining an interior passageway. It should be appreciated that the vehicle seat belt system 20 may be employed with or without a seat belt airbag.

In the embodiment shown, the seat belt webbing 24 includes a shoulder belt 22A that is generally positioned to extend from the connector tongue 32 over the shoulder and chest of a passenger and a lap belt 22B which is positioned to extend over the lap of the passenger when seated in the seat assembly 12. The lap belt 22B and shoulder belt 22A may be integrally formed of the same webbing as shown or connected to one another or may be separate belts, according to other embodiments. It should be appreciated that the shoulder belt 22A or the lap belt 22B or both the shoulder belt 22A and lap belt 22B may include an electric powered heater and electrical circuitry, according to various embodiments.

The vehicle seat belt system 20 includes a seat belt webbing 24 that extends across the first, second, and third connecting points 28, 29 and 30 and forms the shoulder belt 22A and lap belt 22B. The electric powered heater 40 is connected onto the seat belt webbing 24. The seat belt webbing 24 may include a conventional webbing material that forms a seat belt for the lap belt 22B and/or shoulder belt 22A. The seat belt webbing 24 may extend within one or more seat belt retractors such as retractors located near the first connection point 20A and second connection point 26.

The seat belt webbing also may connect to the connector tongue 32. The electric powered heater 40 is attached onto at least a portion of the seat belt webbing 24, particularly shown in one embodiment connected on a portion of the shoulder belt 22A and the lap belt 22B. The electric powered heater 40 may be formed of an electrical resistance heating element such as a resistance heating wire 42 shown in the first embodiment that generates thermal energy or heat when electric current is transmitted thereon. The resistance heating wire 42 may be stitched via stitching onto the seat belt webbing 24, according to one embodiment. The resistance heating wire 42 may extend through the webbing 24 in a stitch pattern extending along a length and/or width of the webbing 24.

The electric powered heater 40 may be formed by an electrically conductive and yet resistive heating element or wire 42 that may be stitched into the seat belt webbing 24 generally along a length or width of the webbing 24. The electric powered heater 40 receives electric power supplied from a power supply across electrical circuitry or power lines which may extend through any of the first, second and third connection points 26, 28 and 30. Electric power may be supplied over electrical circuitry via one or two or more of the first, second and third connection points 26, 28 and 30. In the embodiment shown, electric power is supplied from a power source 38 through electrical circuitry formed in the seat belt buckle 34 and connector tongue 32, when the tongue 32 is connected to the buckle 34. Both a positive polarity voltage (V+) line and a negative polarity voltage (V−) or ground line may be formed by electrical circuitry to supply a high voltage V+ to the heater 40 from the power source 38 and a return line with low voltage V− or a ground path. The electrical circuitry further connects between the connector tongue 32 and the electric powered heater 40 to transmit the electrical power to the heater 40.

The power source 38 may include a vehicle electric power source such as a 12 volt battery and may be provided through a connection in the vehicle seat assembly 12, such as below the lower seat 14. Electrical power may be supplied from the power source 38 through electrical circuitry in the form of one or more power lines 36 to supply power to the electrical circuitry in the seat belt buckle 34. When the seat belt buckle 34 is connected to the connector tongue 32, a closed circuit path in the circuit is formed so that electrical power passes through both the seat belt buckle 34 and connector tongue 32 and further through circuitry provided on the webbing 24 leading to the electrical powered heater 40.

Figure 3:
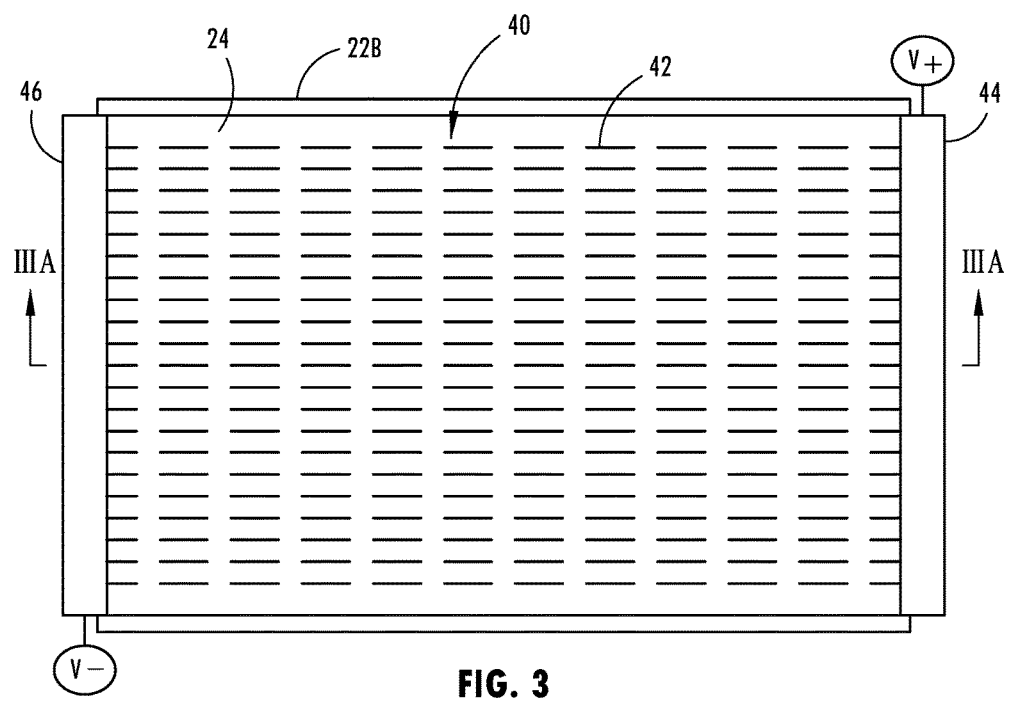
FIG. 3 is an enlarged view of section III of FIG. 2 further illustrating the heating wire stitched on the seat belt webbing with a parallel electrical arrangement, according to a first embodiment.
Figure 3A:
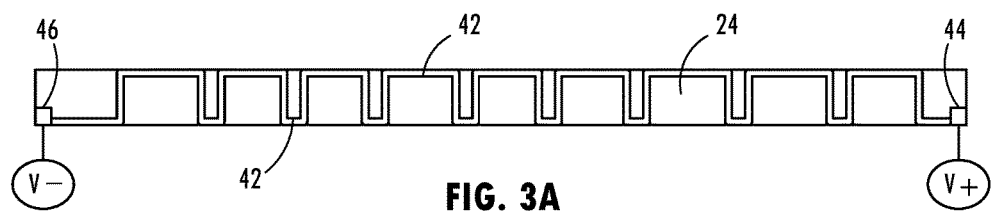
FIG. 3A is a cross-sectional view taken through line IIIA-IIIA of FIG. 1 further illustrating the heating wire stitched into the seat belt webbing.

Referring to FIGS. 3 and 3A, an electric powered heater 40 is illustrated according to the first embodiment. In this embodiment, the electric heater 40 is formed with a sewn electrical resistance heating wire 42 having one or more wires that are sewn or stitched into the seat belt webbing 24 and forms an electric circuit between a power supply line which may receive a positive polarity voltage V+ and a return line which may have a negative polarity voltage V− or ground signal. In the embodiment shown, each resistance heating wire 42 extends between a first bus bar 44 on one side of a heated portion of the webbing 24 and a second bus bar 46 on a second side of the heated portion of the webbing 24. Electrical power, such as a positive polarity power with a voltage V+(e.g., 12 volts) is supplied to the first bus bar 44 and a negative polarity voltage V− or grounded path may be provided to the second bus bar 46. As such, electric current is able to flow from the first bus bar 44 to the second bus bar 46 passing along resistance heating wires 42 which extend in parallel connections between the two bus bars 44 and 46.

Thus, the resistance heater wires 42 are connected in a parallel electrical arrangement. When electric current passes through each parallel connected resistance heating wire 42, the electric current generates thermal energy or heat. In the embodiment shown, the resistance heating wire 42 is stitched into the seat belt webbing 24 such that a greater portion of the heating wire 42 is present on the surface facing the seat belt passenger as shown, whereas the heating wire 42 passes through a depth of the seat belt webbing 24 and has a shorter surface portion on the opposite side facing away from the seated passenger. The resistance heating wire 42 may be stitched to pass through the material of the seat belt webbing 24, such as through or around a warp and weft webbing pattern in the webbing material and may be configured in various patterns and sizes.

Figure 3B:
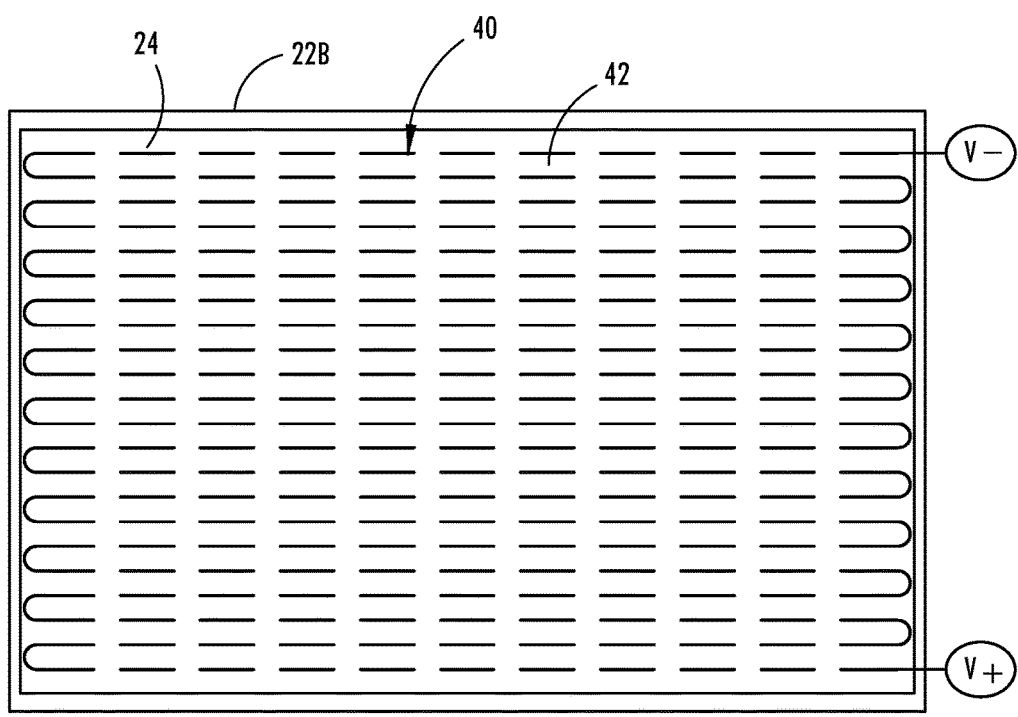
FIG. 3B is an enlarged view of a section of the seat belt illustrating the heating wire arranged in a series electrical connection, according to an alternative embodiment.

It should be appreciated that electric power may be supplied to and return from the resistance heating wire 42 according to other embodiments. For example, the resistance wire 42 may be stitched into the seat belt webbing 24 in a series connection to form a series resistance heater as shown in FIG. 3B. This may be achieved by replacing the first and second bus bars 44 and 46 with a continuous resistance heating wire 42 which connects adjacent rows of resistance wire together. Further, it should be appreciated that the positive polarity voltage V+ and negative polarity voltage V− sides of the heater 40 may be both electrically connected via power lines through the connector tongue 32 and seat belt buckle 34 or one or more of the power lines may connect through conductive circuitry extending to either the first connection point 28 or second connection point 26, both of which may connect to retractors or anchor points on the vehicle.

The buckle 34 has a pushbutton latch 90 for releasably engaging an opening 80 in the tongue 32 (FIG. 8A) and latching the connector tongue 32. The connector tongue 32 is inserted into and releasably connects with the buckle 34 so as to engage and latch the connector tongue 32 and the seat belt attached thereto to the buckle 34. In doing so, the connector tongue 32 is aligned with and operatively engages a chamber and latch 90 provided within the buckle 34. The connector tongue 32 may include a first conductive circuit 100 provided thereon and electrically connected to the circuitry provided on the seat belt webbing 24. The first circuit may include a first circuit line 102A for transmitting a high polarity voltage V+ and a second circuit line 102B for transmitting a return low polarity voltage V− or ground. The buckle 34 may include a second circuit 110 configured to matingly engage the first circuit 100 when the connector tongue 32 is fastened to the buckle 34. The second circuit is further electrically coupled to the power line 36 to receive power from the power source 38. The second circuit may likewise include a first circuit line 112A for receiving a high polarity voltage V+ and a return second circuit line 112B for receiving a low polarity voltage V− or ground signal.

Figure 4:
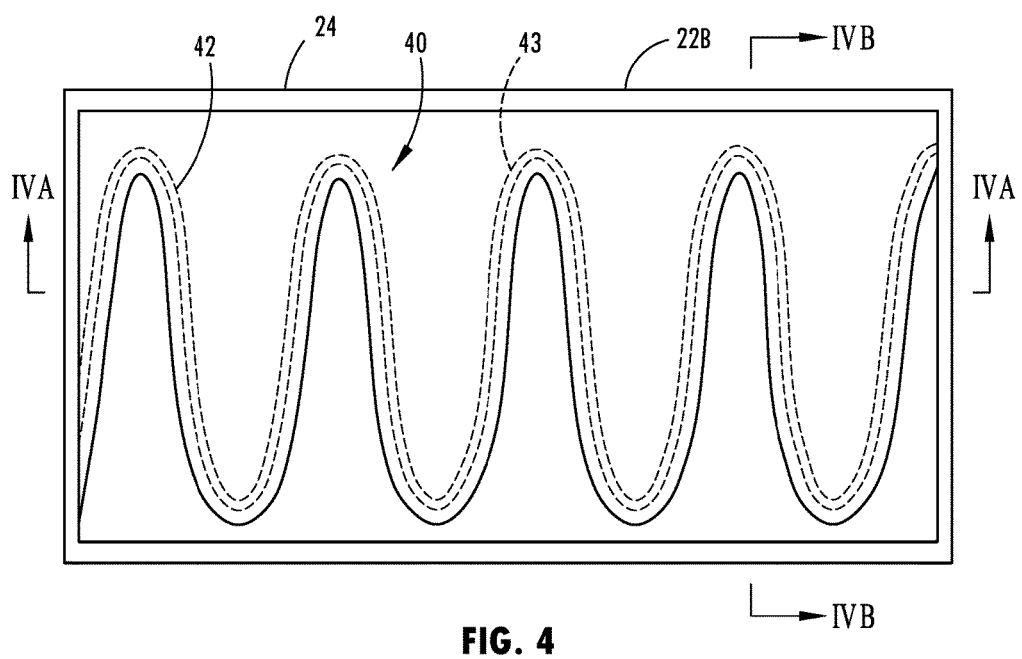
FIG. 4 is an enlarged sectional view of a portion of the seat belt illustrating an electric heater formed in a tubular webbing, according to a second embodiment.
Figure 4A:
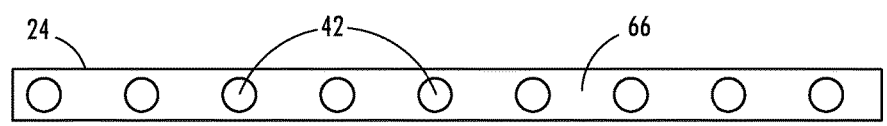
FIG. 4A is a cross-sectional view taken through line IVA-IVA of FIG. 4 further illustrating the electric heater disposed within the tubular webbing.
Figure 4B:
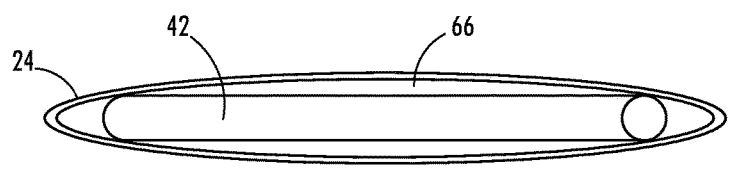
FIG. 4B is a cross-sectional view taken through line IVB-IVB of FIG. 4 further illustrating the electric heater within the tubular webbing.

Referring to FIGS. 4-4B, an electric powered heater 40 is illustrated disposed within a tubular seat belt webbing 24, according to a second embodiment. In this embodiment, the seat belt webbing 24 is shown formed in a somewhat collapsed or flattened state having a top layer connected to or integrally formed with a bottom layer and having a passageway 66 therebetween. One example of a material suitable for forming the seat belt webbing 24 is a woven polyester which may be coated with a silicone layer. However, the seat belt webbing 24 may be formed of other materials. The electric heater 40 may be formed of one or more electric resistance heating wires 42 that are disposed within the passageway 66 of the tubular seat belt webbing 24. The heating wire 42 may include a single wire extending from one end of the heating portion to the other end of the heating portion which then connects to a high polarity voltage V+ at one end and a low polarity voltage V− or ground at the opposite end. Alternatively, a return line shown by dashed line 43 of the heating wire 42 may extend through the passageway 66 so that the high voltage V+ and low voltage V− terminals are on the same end of the heating portion and may easily connect to electrical circuitry on the same side of the heater 40. In the embodiment shown, the resistance heating wire 42 extends in a sinusoidal waveform pattern, however, it should be appreciated that the heating wire 42 may extend in various other patterns as desired to generate the desired heating effect.

Figure 5:
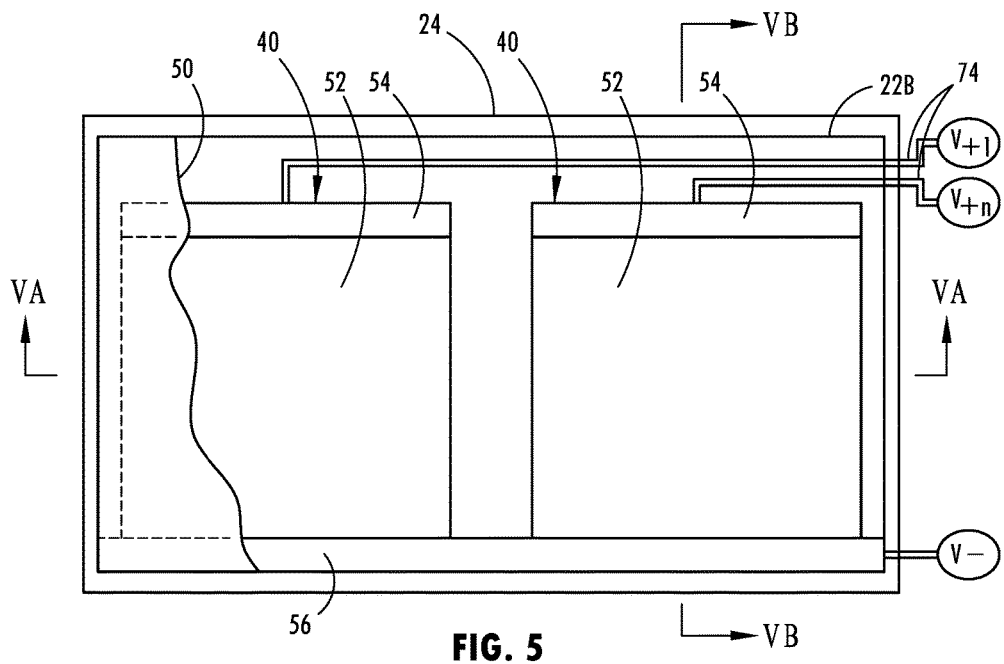
FIG. 5 is an enlarged sectional view of a portion of the seat belt further illustrating an electric heater in the form of a plurality of electrical resistance heating sheets, according to a third embodiment.
Figure 5A:
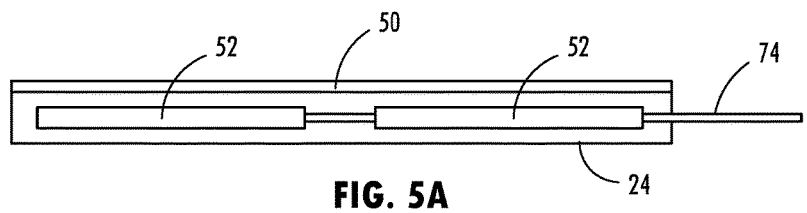
FIG. 5A is a cross-sectional view taken along VA-VA of FIG. 5 further illustrating the electric heater.
Figure 5B:
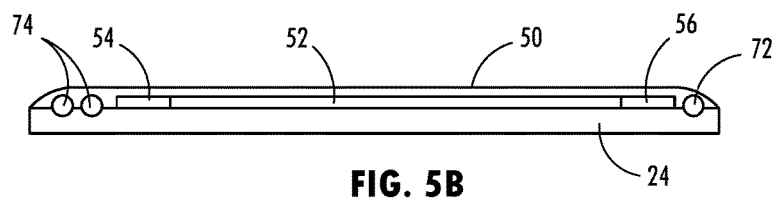
FIG. 5B is a cross-sectional view taken through line VB-VB of FIG. 5 further illustrating the electric heater.

Referring to FIGS. 5-5B, an electric powered heater 40 is shown attached to the seat belt webbing 24 and having a planar or sheet shaped heater arrangement according to a third embodiment. In this embodiment, the heater 40 is formed of one or more resistance heater sheets 52 which may be stitched or otherwise attached onto one or more portions of the seat belt webbing 24. In the embodiment shown, a plurality of heater sheets 52 are employed and may be individually controlled with separate power lines to supply voltages, such as high voltages $V+_1$ through V+n to create individually controllable heating zones. Each separately heatable region includes an electrical resistance heating sheet 52 located on the seat belt webbing 24. The heating sheet 52 may be covered with a dielectric and thermally conductive cover layer 50 which allows thermal energy to pass therethrough and dielectrically isolates the heating sheets 52. The heating sheets 52 may each be located between high and low power bus bars 54 and 56 such that electric current may pass from bus bar 54 at high voltage V+ to bus bar 56 at low voltage V− or ground. The bus bar 54 is coupled to one or more of the high voltage power supply lines and bus bar 56 is coupled to the low polarity or ground return line. As such, electric current may pass from the bus bar 54 to bus bar 56 within each of the individually controllable heater sheets 52 which in turn generate thermal energy or heat.

Figure 5C:
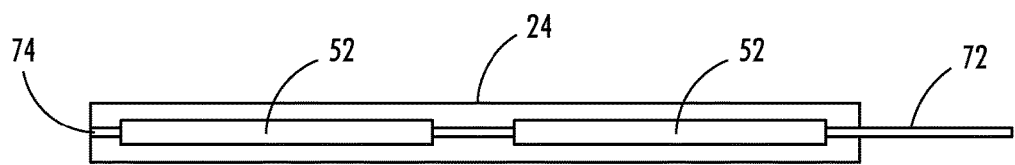
FIG. 5C is a sectional view of a seat belt having a resistance heating sheet sandwiched in layers of a tubular seat belt webbing, according to an alternate embodiment.
Figure 5D:
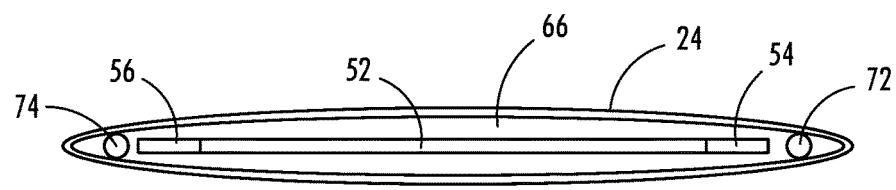
FIG. 5D is a sectional view of the seat belt shown in FIG. 5C further illustrating a resistance heating sheet within a tubular webbing, according to a further alternate embodiment.

The electric powered heater 40 may otherwise be configured to include one or a plurality of heater sheets 52 that are planar or sheet shaped heaters that are sandwiched within layers of the seat belt webbing 24 as shown in FIG. 5C or disposed within a passageway 66 in a tubular shaped seat belt webbing 24 as shown in FIG. 5D or otherwise attached to the outside surface of the seat belt webbing 24. As seen in FIG. 5C, a plurality of resistance heater sheets 52 are sandwiched between a top layer and a bottom layer of a seat belt webbing 24 which may include any conventional material. As seen in FIG. 5D, the heater sheet 52 or one or more heater sheets 52 may be disposed within a passageway 66 extending within the seat belt webbing 24. It should be appreciated that each of the heater sheets 52 may be individually controlled or may be controlled in sync to provide heating to the seat belt.

According to various embodiments, the sewn resistance heating element may include a resistive sheet element or wire sewn, glued, or laminated onto the webbing and coupled in parallel between positive and negative bus bars. The resistance heating element may include a resistive sheet element or wire sewn, glued, or laminated onto the webbing in series.

Figure 6:
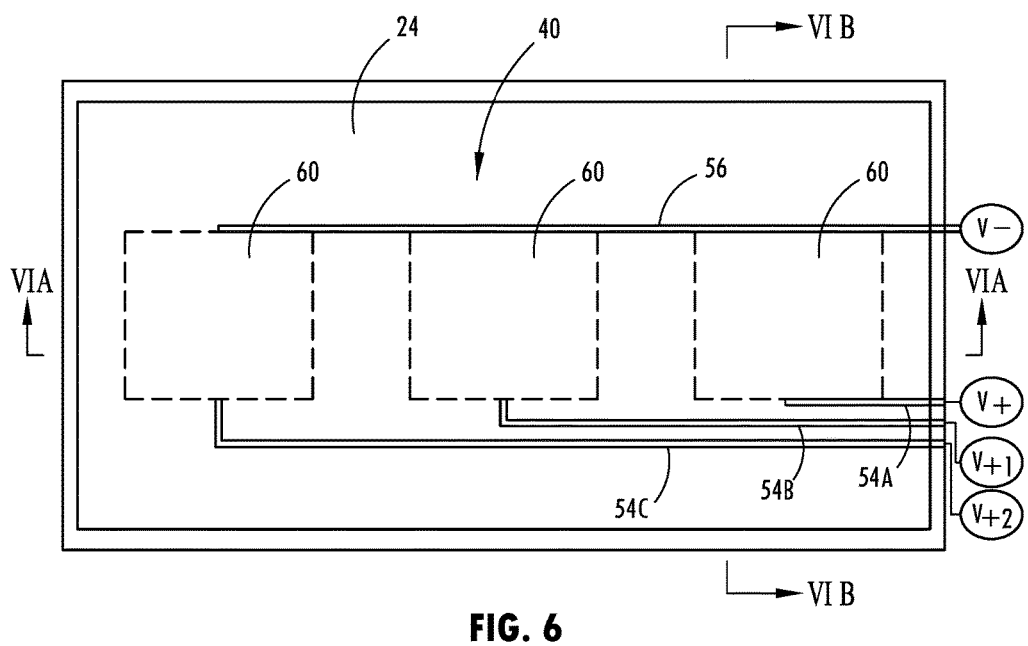
FIG. 6 is an enlarged view of a portion of the seat belt further illustrating an electric heater and cooler formed with thermoelectric devices, according to a fourth embodiment.
Figure 6A:
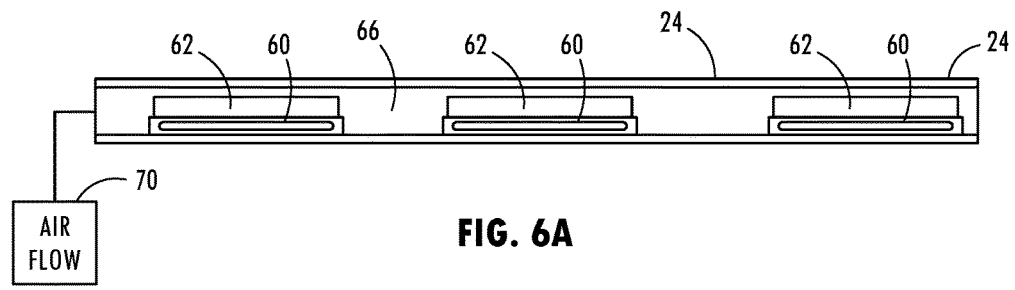
FIG. 6A is a cross-sectional view taken through line VIA-VIA of FIG. 6 further illustrating an thermoelectric heater and cooler.
Figure 6B:
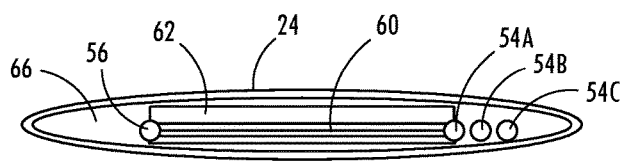
FIG. 6B is a cross-sectional view taken through line VIB-VIB of FIG. 6 further illustrating the thermoelectric heater and cooler.

Referring to FIGS. 6-6B, an electric powered heater 40 is illustrated having a plurality of thermoelectric devices (TEDs) 60 for providing conduction heating and cooling according to a fourth embodiment. In the embodiment shown, a plurality of thermoelectric devices 60 are shown connected with individual high polarity voltage V+ lines 54A-54C for receiving respective high voltage signals V+, $V+_1$, and $V+_2$ and low polarity or ground line 56 for receiving low voltage signal V−. However, it should be appreciated that each of the thermoelectric devices 60 may be otherwise controlled having separate power lines to create separately controllable heating and cooling regions or may share a common voltage line. For example, the thermoelectric devices 60 may be coupled to respective a positive bus bar and a negative bus bar for supplying current therebetween across one or more or all of the thermoelectric devices 60.

The thermoelectric devices 60 are shown located within a tubular seat belt webbing 24, such that air from an air delivery device 70 may be delivered through the passageway 66 formed within the tubular webbing 24 in communication with a heat sink 62. The thermoelectric devices 60 operate to provide heating in one mode and in an opposite polarity mode can be reversed so as to provide cooling. The thermoelectric devices 60 operate in the heating mode by heating the occupant and cooling the ambient air passing through the air passageway. In reverse, in the cooling mode, the thermoelectric device 60 operates by cooling the side of the passenger and heating the air in the ambient air flow passageway 66. In the cooling mode, ambient or cooled air moves along the air flow passageway 66 furthest from the occupant, thereby providing heat removal from the thermoelectric devices 60. Each of the thermoelectric devices 60 thereby conductivity heats or cools the body of the passenger when a voltage is applied.

Accordingly, the seat belt system 20 advantageously employs an electric powered heater 40 which may include various types of heaters attached to the seat belt webbing 24. While specific embodiments of electric powered heaters are shown and described herein, it should be appreciated that other types of electric powered heaters may be connected in the same or similar manner to the seat belt webbing 24 to provide heating.

The electric powered heater 40 may be powered with electric power supplied on electrical circuitry that may pass through the connector tongue 32 and buckle 34 so as to supply electric power from a vehicle power supply to the heater 40. It should be appreciated that electric power may otherwise be supplied to the electric heater 40 through any one or more of the first, second and third connection points 26, 28 and 30, according to other embodiments. For example, electric power could be supplied via power supply circuitry in either a seat belt retractor or a seat belt anchor provided in the seat or anchor point on the vehicle. It should further be appreciated that electric power, such as a high voltage V+ and low voltage V− may be supplied from different locations.

The electrical circuit for supplying electrical current through the connector tongue 32 and buckle 34 may be employed to power any of a number of electrical powered devices that may be located on or near the seat belt. For example, the electrical circuitry may supply electrical power to lighting devices or other electric power consuming devices that may be located on the seat belt. The electrical circuitry passing through the connector tongue 32 and buckle 34 may be configured in any of a number of embodiments as described below.

Figure 7:
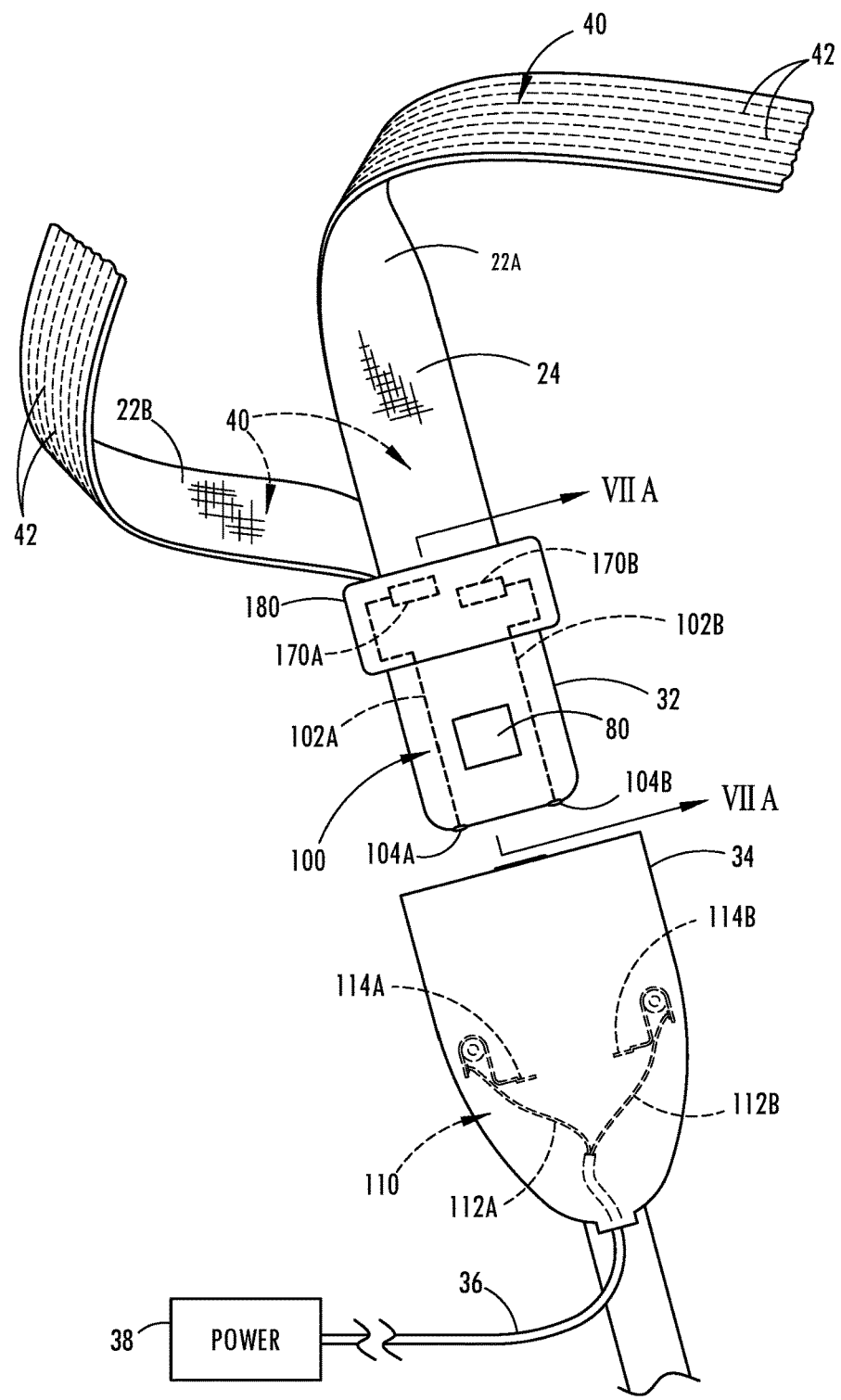
FIG. 7 is an enlarged side view of a portion of the seat assembly illustrating the connector tongue and buckle in a disconnected position and configured with electrical power circuitry, according to a first embodiment.
Figure 8A:
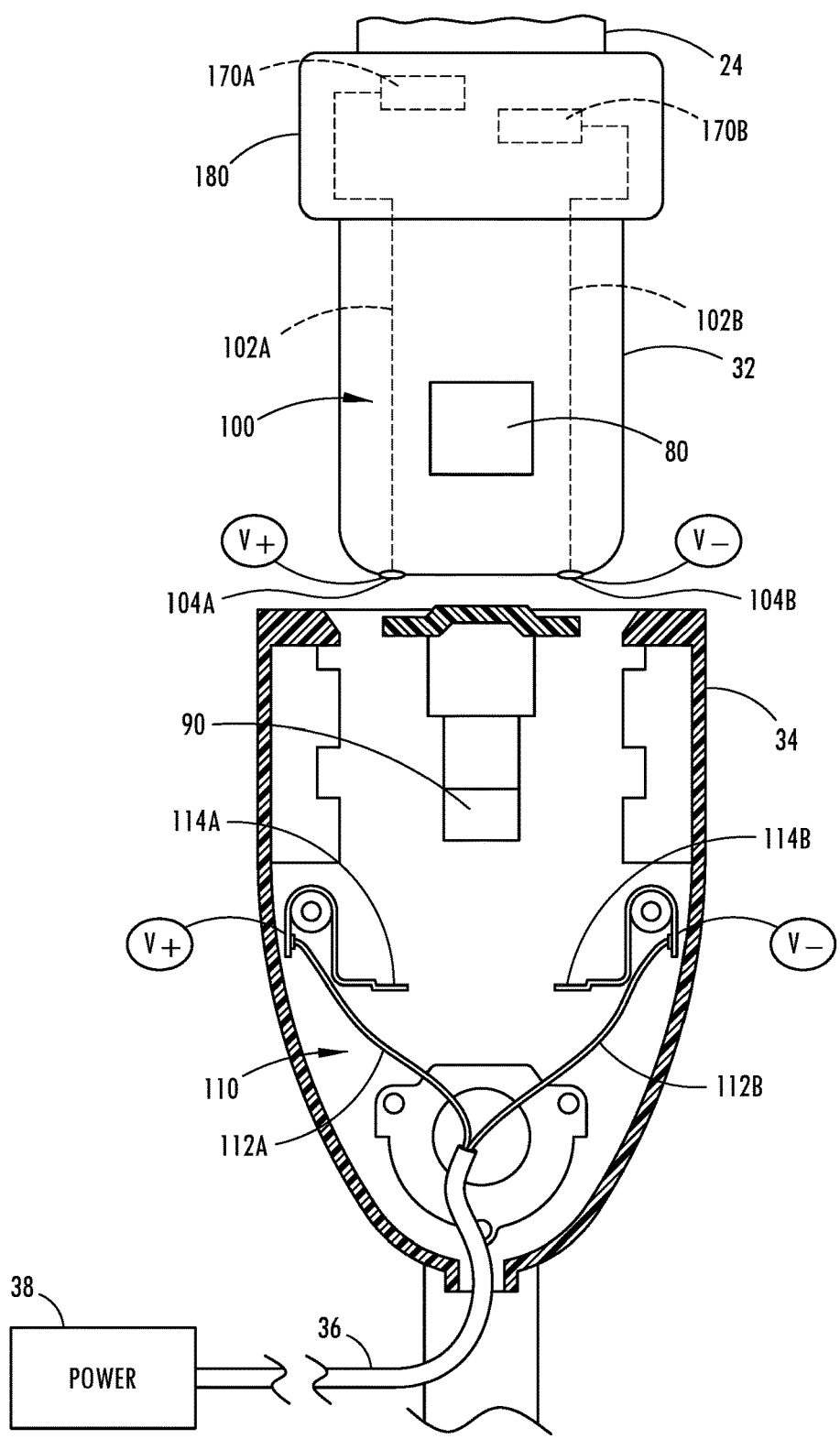
FIG. 8A is an enlarged sectional view of the connector tongue and buckle shown in FIG. 7 illustrating the electrical power circuitry.
Figure 8B:
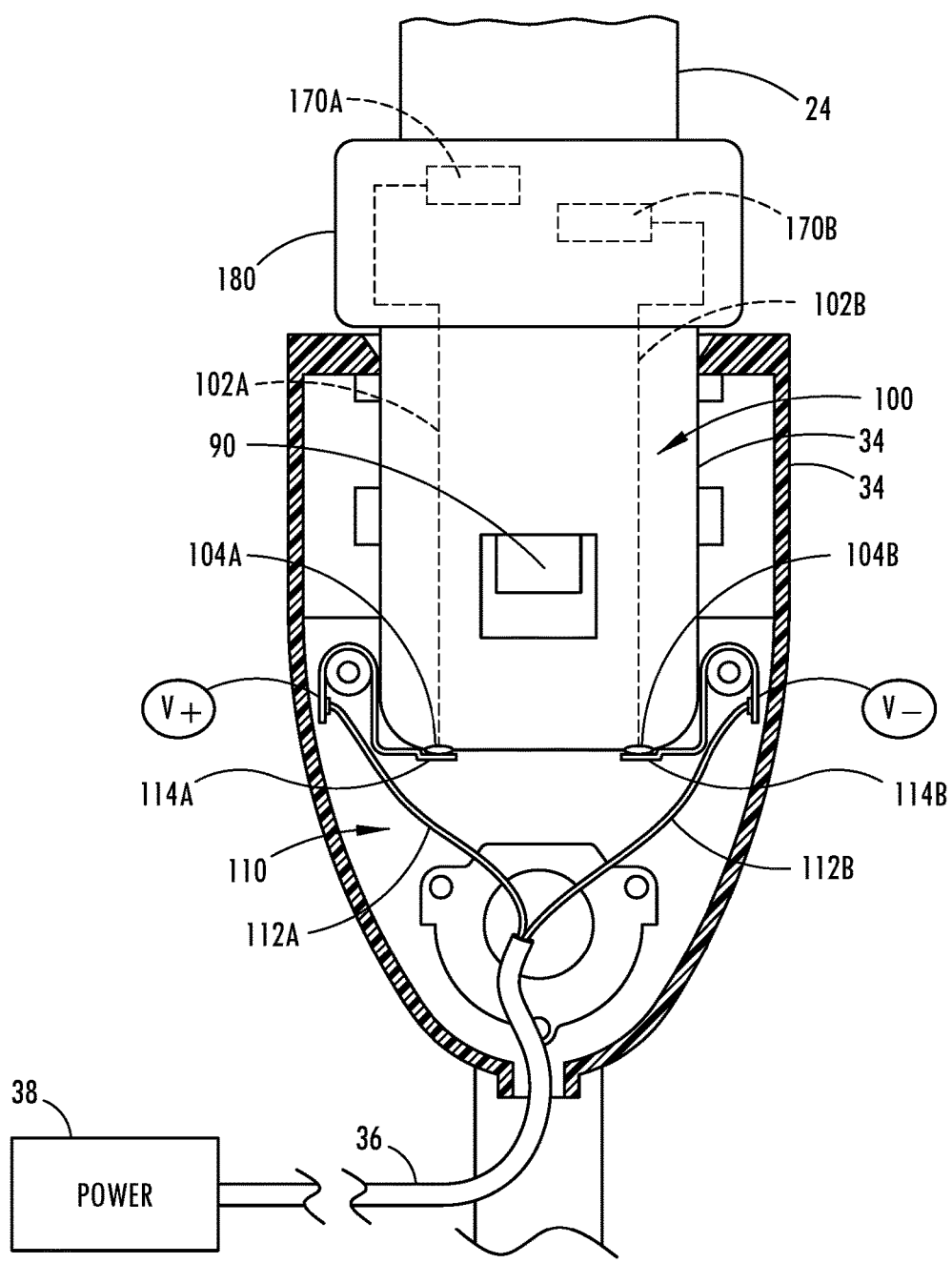
FIG. 8B is an enlarged sectional view of the connector tongue and buckle of FIG. 8A with the tongue latched in the buckle in the connected position.

Referring to FIGS. 7-8B, the seat belt system 20 is shown with the connector tongue 32 and buckle 34 both configured with electrical power circuitry according to a first embodiment. The electrical power circuitry supplies power between the power source 38 and a power consuming device on the seat belt, such as the electrical heater 40, according to one example. The connector tongue 32 has a first circuit 100 which includes a first power line 102A and a second power line 102B. The power lines 102A and 102B extend from contacts at the terminal end of the tongue 32, referred to as first and second contacts 104A and 104B, respectively and extend to the opposite end of the tongue 32 to contacts 170A and 170B that electrically connect with electrical circuitry on the seat belt webbing 24. The first and second contacts 104A and 104B may include fixed or spring biased contacts and are configured to make contact with a second circuit 110 provided on the buckle 34. The second circuit 110 includes a first power line 112A and a second power line 112B which connect to power supply line 36 leading from the power supply 38. The second circuit 110 further includes a first contact pad 114A and a second contact pad 114B located so as to receive and contact the contacts 104A and 104B of the first circuit 100 when the connector tongue 32 is connected and latched onto the buckle 34. It should be appreciated that the connector tongue 32 may latch onto the buckle 34 when a latch element is received within the opening 80 on tongue 32. The first and second contact pads 114A and 114B may be resilient to allow for a continuous electrical contact between first and second contacts 104A and 104B and first and second pads 114A and 114B, respectively, despite slight movement therebetween. In one embodiment, the first and second contact pads 114A and 114B may be formed as springs that may bend or rotate when contacted to maintain a connection with the contacts 104A and 104B despite a limited amount of movement. The contacts 104A and 104B could otherwise be configured as translatable carriers that may be spring loaded.

Figure 7A:
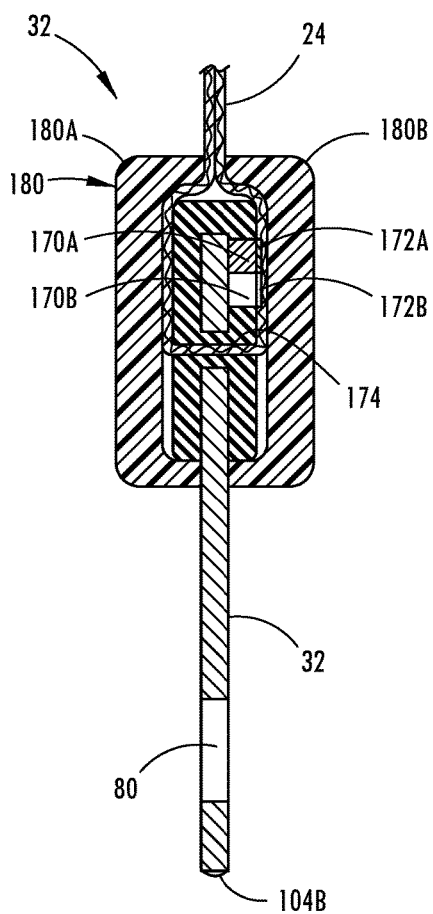
FIG. 7A is a cross-sectional view taken through line VIIIA-VIIIA of FIG. 7 illustrating the connector tongue and webbing connections.
Figure 7B:
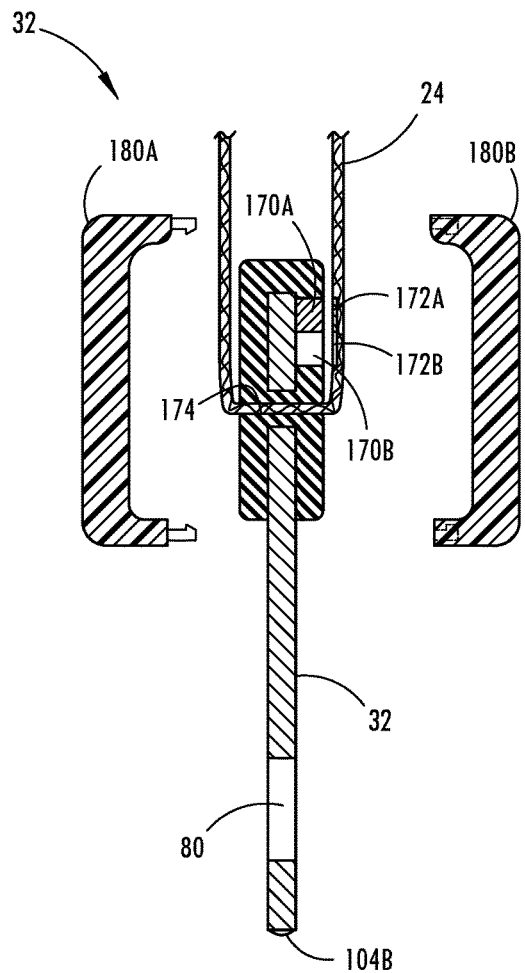
FIG. 7B is a partial exploded view of the connector tongue and webbing arrangement shown in FIG. 7A.

The connection of the connector tongue 32 and the first circuit 100 on the connector tongue 32 to the seat belt webbing 24 and the circuitry on the webbing 24 is further illustrated in FIGS. 7A and 7B. The seat belt webbing 24 may extend within a slot 174 provided in the connector tongue 32 and may wrap back upon itself and may further be connected together via stitching, adhesive or other connector to form a fixed position on the connector tongue 32. One portion of the seat belt webbing 24 therefore extends as a lap belt and the other portion extends as a shoulder belt. The contacts 170A and 170B provided on the tongue 32 are aligned to engage contacts 172A and 172B on a surface of the seat belt webbing 24. Contacts 172A and 172B, in turn, are electrically connected to electrical circuitry on the webbing 24 and may connect to one or more powered devices, e.g., heater, to provide a high voltage V+ and a low voltage V− or ground return path. The connection of contact pads 172A and 172B to circuitry on the webbing 24 may include soldering, adhesive or other forms of connectors to solidify the connection and maintain the connection therebetween. A cover 180 is further illustrated covering the portion of the tongue 32 that includes the connection with the seat belt webbing 24. The cover 180 may include a first cover member 180A that connects to a second cover member 180B to contain the webbing connection and electrical contact connections therein. The cover members 180A and 180B may snap together or be connected via fasteners, adhesive or other connectors.

When the seat belt is unlatched such that the connector tongue 32 is disconnected from the buckle 34 as seen in FIGS. 7 and 8A, the first circuit 100 is disconnected from the second circuit 110 to form an open circuit path such that power in the form of electrical current is unable to flow from the power supply 38 to the seat belt webbing 24. When the connector tongue 32 is connected and latched onto the buckle 34 as shown in FIG. 8B, the first circuit 100 connects to the second circuit 110 to form a closed circuit path to allow electric current from the power supply 38 to be transmitted to one or more electric powered devices on the seat belt webbing 24. In doing so, the first circuit 100 forms an electrical connection with the second circuit 110 via first and second contacts 104A and 104B contacting respective contact pads 114A and 114B. A latch 90 in the buckle 34 engages opening 80 in the tongue 32 so as to maintain the connector tongue 32 latched in place within the buckle 34. In this embodiment, the first circuit line 102A and first power line 112A transmit a high voltage V+, whereas the second circuit 102B and second power line 112B form a return path to transmit a low voltage V− or ground signal. If the connector 32 is flipped 180° within the buckle 34, the voltage polarity on the first and second circuits 102A and 102B may be reversed.

Figure 9:
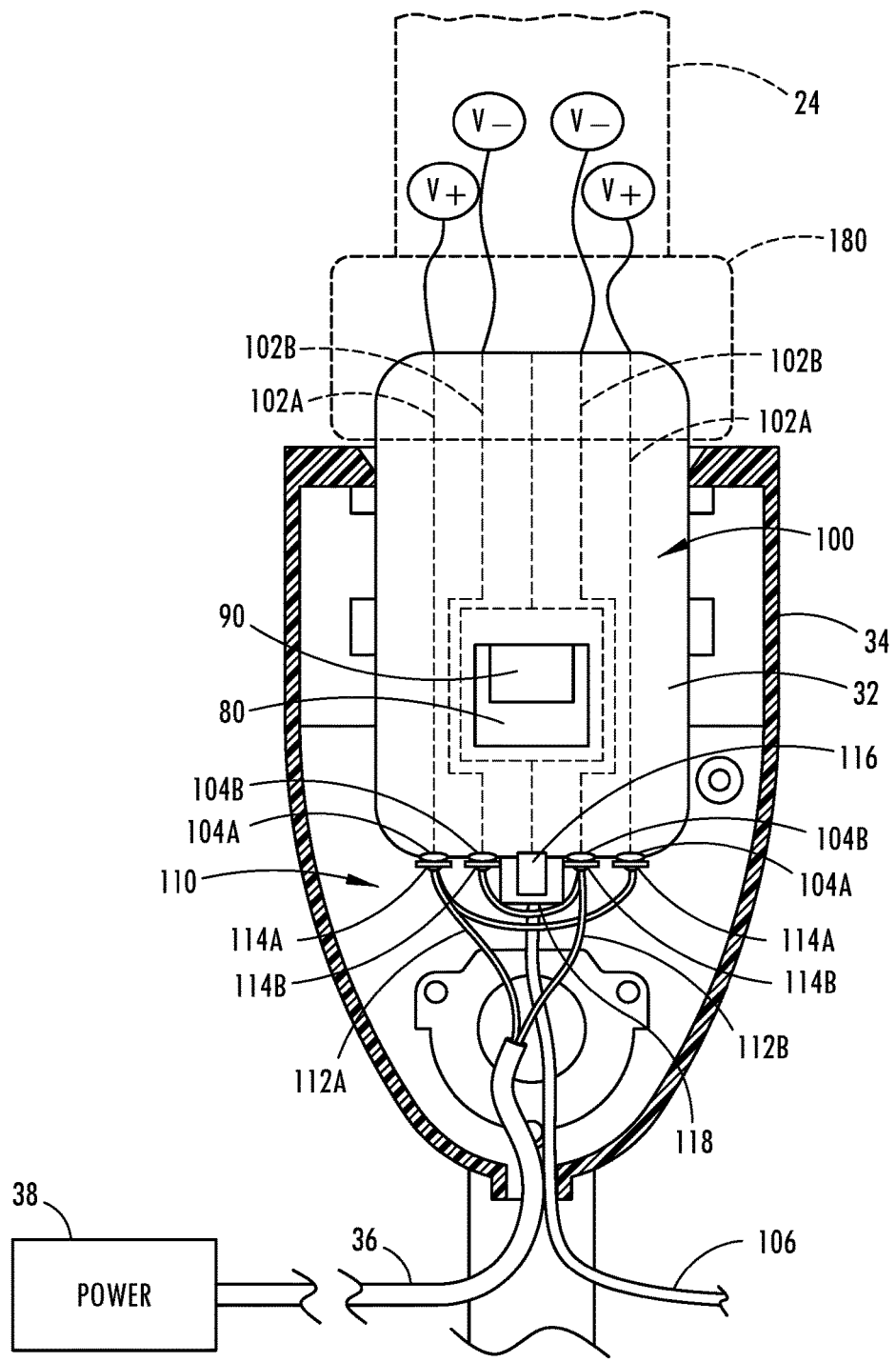
FIG. 9 is a sectional view taken through the buckle with the tongue connected thereto and illustrating electrical power circuitry, according to a second embodiment.

Referring to FIG. 9, the electrical power circuitry provided on the connector tongue 32 and buckle 34 is configured to include a plurality of high voltage V+ lines and low voltage V− lines and further may include a communication port, such as a USB connector, according to a second embodiment. In this embodiment, the first circuit 100 on the connector tongue 32 includes two power lines 102A on opposite ends for delivering the high voltage V+ power and two power lines 102B in between lines 102A for transmitting the low voltage V− power or ground. This allows the connector tongue 32 to be flipped 180° front to back and to make the same polarity contacts with the second circuit on the buckle 34. To accommodate the four power lines on the connector tongue 32, the buckle 34 is configured with four receiving pads 114A and 114B positioned for making contact with the contacts 104A and 104B when the connector tongue 32 is connected and latched onto the buckle 34.

The connector tongue 32 includes a USB communication port connector 116 which is configured to connect with a USB connector 118 on the buckle 34. As such, the USB connectors 116 and 118 allow for data to be communicated through the buckle 34 and connector tongue 32. This may enable data communication to be transmitted to one or more devices on the seat belt webbing 24 such as control signals for controlling one or more heaters, lights, or other powered devices.

Figure 10:
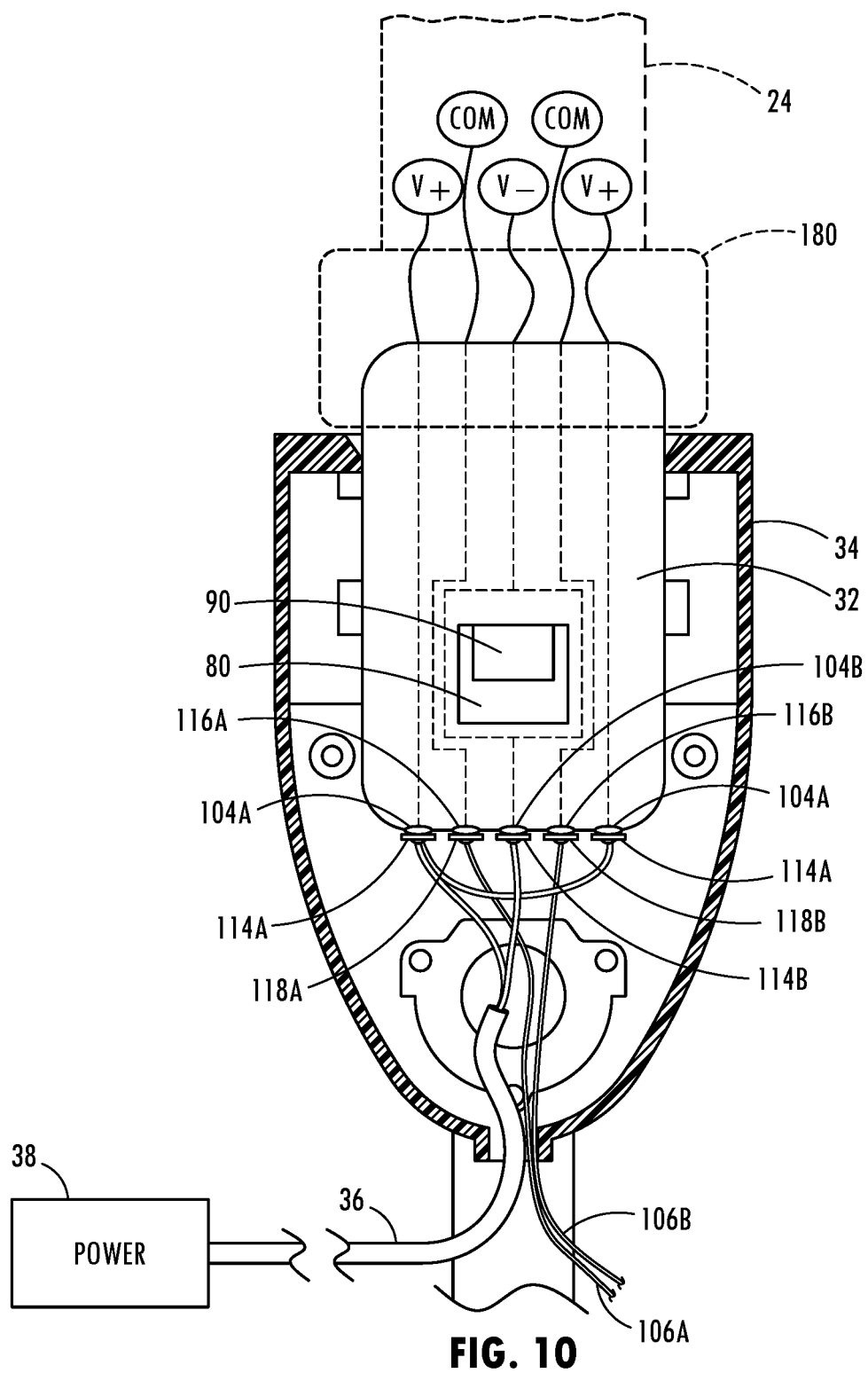
FIG. 10 is a sectional view taken through the buckle with the tongue connected thereto and illustrating electrical power circuitry, according to a third embodiment.

Referring to FIG. 10, electrical power circuitry is shown in the connector tongue 32 and buckle 34 similar to that shown in FIG. 9, but with separate data communication lines 106A and 106B according to a third embodiment. In this embodiment, the data communication lines 106A and 106B are connected to separate connector pads 118A and 118B of the second circuit in the buckle 34 which, in turn, connects to separate contacts 116A, 116B of the first circuit on the connector tongue 32. The connector contact pad 114B and contact 104B in the middle of the tongue 104B is configured to receive a negative voltage V− or ground, whereas the two outside circuit connections of contacts 104A and pad 114A are configured to receive high voltage V+. As such, the pair of data communication lines may provide data to one or more devices on the seat belt webbing 24.

Figure 11A:
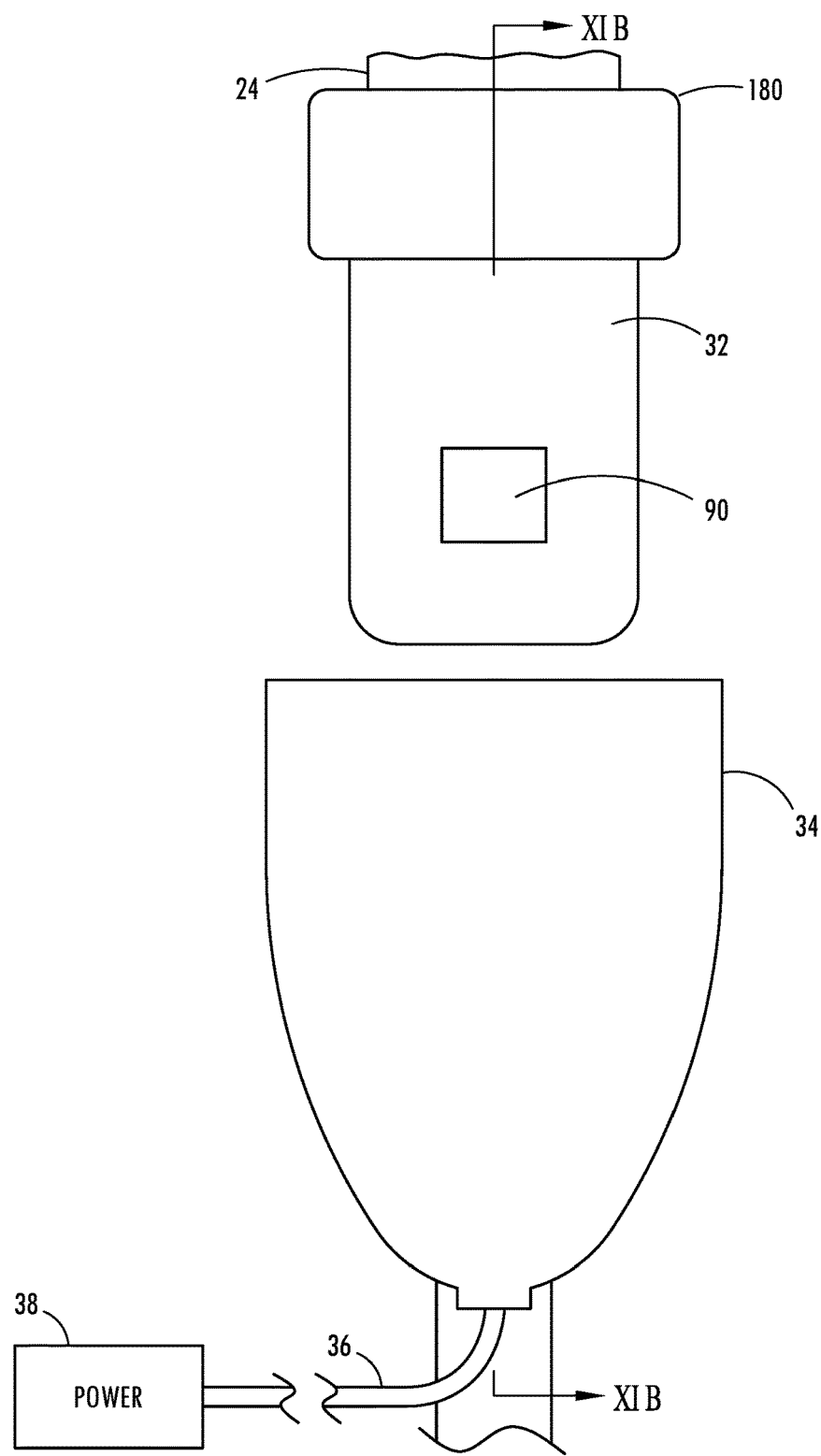
FIG. 11A is a front view of a disconnected tongue and buckle having electrical power circuitry, according to a fourth embodiment.
Figure 11B:
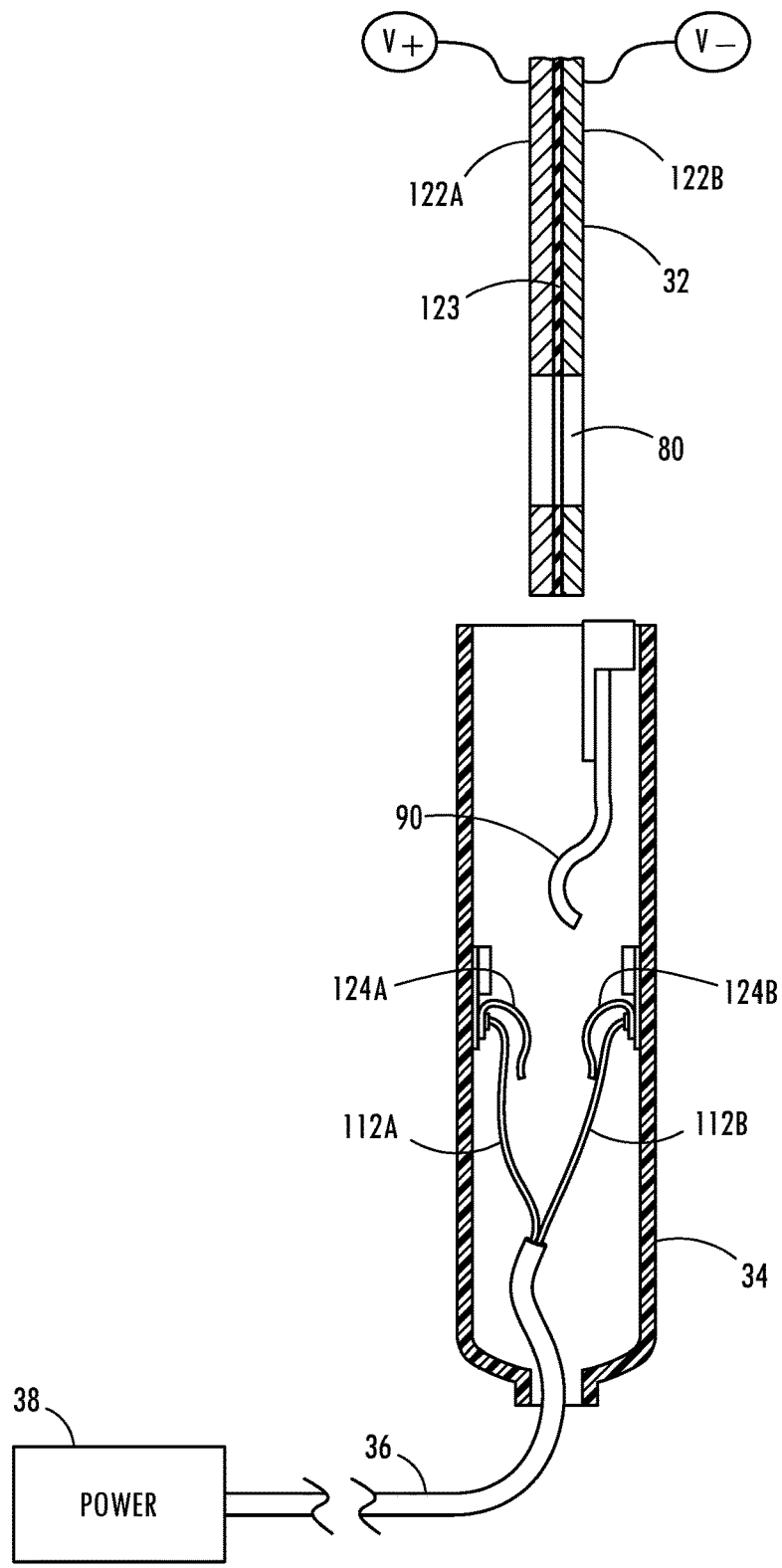
FIG. 11B is a cross-sectional view taken through line XIB-XIB of FIG. 11A further illustrating the electrical power circuitry.
Figure 11C:
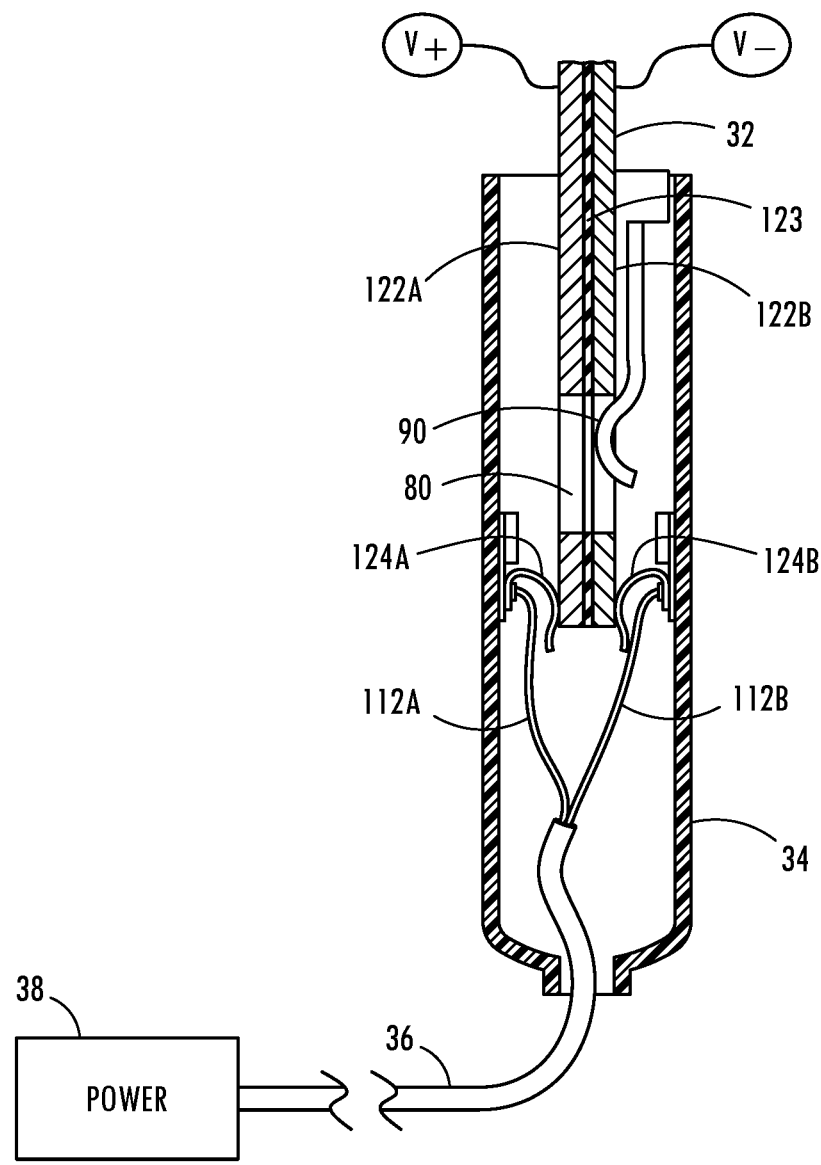
FIG. 11C is a cross-sectional view taken through line XIB-XIB of FIG. 11A with the tongue connected within the buckle.

Referring to FIGS. 11A-11C, electrical power transmission through the connector tongue 32 and buckle 34 is illustrated according to a fourth embodiment. In this embodiment, the connector tongue 32 is configured of a first electrically conductive material on a first side and a second electrically conductive material on the opposite second side and separated via a dielectric material 123 therebetween. The first conductive material on the first side forms a first circuit path 122A and the second conductive material on the opposite second side forms a second circuit path 122B. The dielectric material 123 dielectrically isolates the first and second circuit paths 122A and 122B from one another. The buckle 34 includes a first contact 124A and a second contact 124B located on opposite sides of the buckle 34 and configured to engage the respective first circuit path 122A and second circuit path 122B when the connector tongue 32 is disposed within and latched onto the buckle 34 as seen in FIG. 11C. When this occurs, a latch 90 engages opening 80 to latch the connector tongue 32 fixed in place on the buckle 34. At the same time, the contacts 124A and 124B contact the opposite surfaces of the tongue 32 forming the first and second circuit paths 122A and 122B to allow electric current to flow from the power supply 38 to one or more power devices on the seat belt webbing 24 and return.

Referring to FIGS. 12A-12D, an electrical power connection circuit on the connector tongue 32 is shown according to a fifth embodiment. In this embodiment, the connector tongue 32 includes a pair of electrical contact strips 142A and 142B on each of the first and second opposite sides of the tongue 32. The contact strip 142A on each side is located offset from the center towards the side and receive the high voltage V+, whereas the contact stripes in the middle of the tongue essentially aligned along the longitudinal axis receive the low voltage V- or ground signal. As such, the connector tongue 32 may be flipped or rotated 180° and still make the correct polarity contacts with the circuitry on the buckle 34. It should be appreciated that the buckle 34 includes electrical contacts configured to matingly engage one of the high voltage power lines 142A and one of the low voltage power lines 142B to complete the circuit connection to supply electrical current to one or more powered devices on the seat belt webbing 24.

Referring to FIGS. 13A-13D, the connector tongue 32 is illustrated having electrical power circuitry according to a sixth embodiment. In this embodiment, a first side of the connector tongue 32 has an electrically conductive material that forms a conductive path 122A and the opposite second side includes an electrically conductive material that forms a second circuit path 122B. The first and second sides are separated by a dielectric material 123. In addition, the conductive material on the first circuit side forming the first path 122A extends to the opposite second side in an area surrounding the opening 80 and is dielectrically isolated by dielectric layer 146 from the first circuit path 122A. As such, electrical contacts in the buckle 34 can be located on one side to contact both the first circuit path 122A and second circuit path 122B on the same side of the tongue 32. It should be appreciated that the buckle 34 has contacts on the same side for engaging both the first and second circuit paths 122A and 122B.

Referring to FIGS. 14A-14B, an electrical power circuit is provided on the connector tongue 32 according to a seventh embodiment. In this embodiment, the connector tongue 32 is made of an electrically conductive material within the central region forming a first circuit path 152 and on three sides is surrounded around the perimeter by a dielectric layer 156. A further conductive material forming a second circuit path 154 is formed on the three sides around the dielectric layer 156. As such, the dielectric layer 156 dielectrically isolates the first conductive path 152 from the second conductive path 154. As such, the buckle 34 may be configured with contacts to engage the first circuit path 152 and the second circuit path 154 when the connector tongue 32 is latched within the buckle 34.

Referring to FIG. 15, the connector tongue 32 is illustrated having a shaped similar to that shown in FIGS. 14A and 14B, except the outer terminal portion thereof has the first circuit path 152 further extending to the terminal portion according to an eighth embodiment. In this embodiment, the dielectric layer 156 does not completely surround the first path on the terminal end, but does surround a portion of the terminal end and two sides such that the first circuit path 152 and the second circuit path 154 may be contacted at the terminal end of the connector tongue. This allows the buckle 34 to have contacts configured to engage the first circuit path 152 and second circuit path 154 at the terminal end of the tongue 32.

Figure 16A:
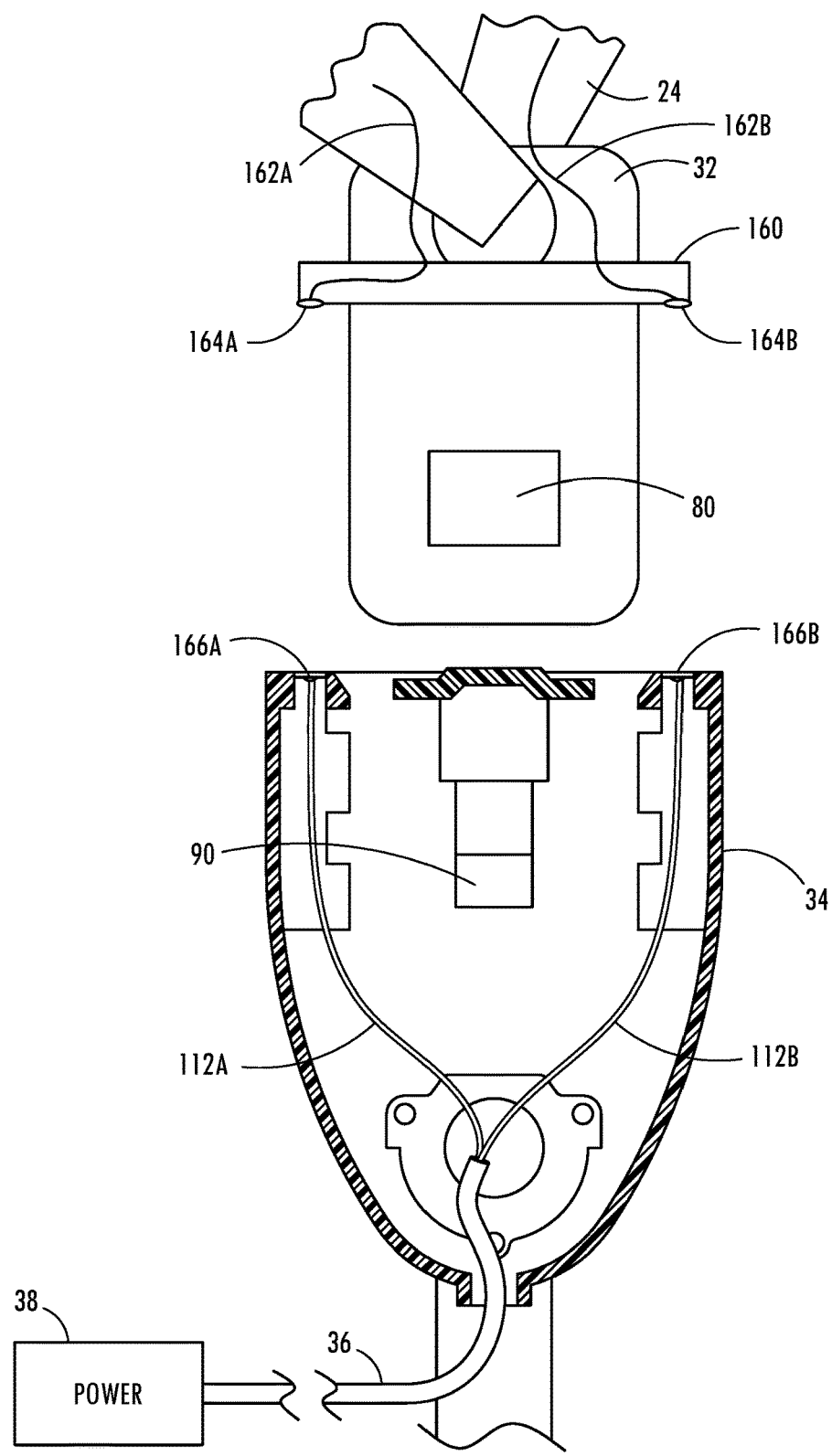
FIG. 16A is a sectional view taken through the buckle and disconnected from the tongue and illustrating a power connecting collar connected to the tongue for providing electrical power circuitry, according to a ninth embodiment.
Figure 16B:
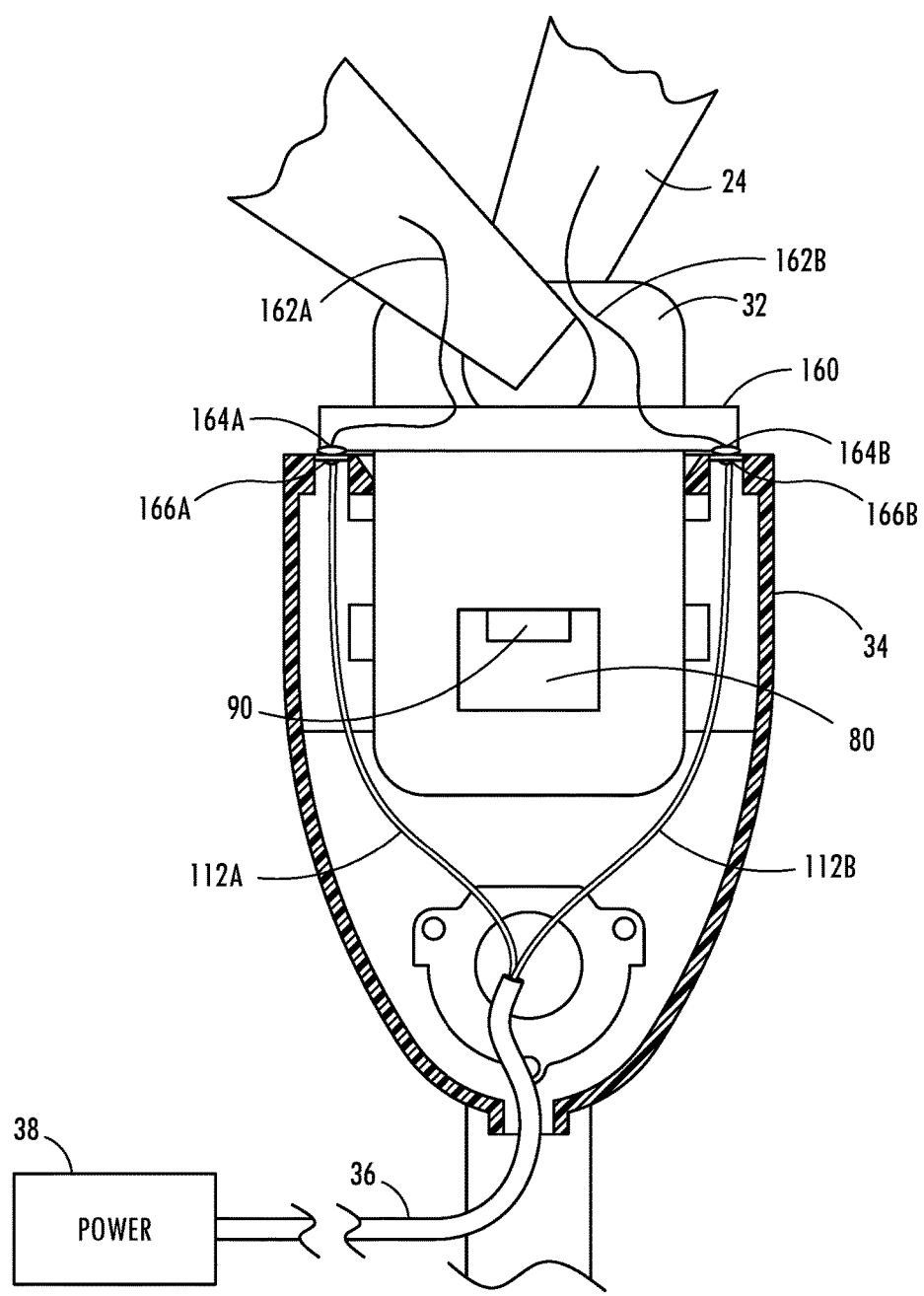
FIG. 16B is a sectional view taken through the buckle of FIG. 16A with the tongue connected to the buckle.

Referring to FIGS. 16A and 16B, a seat belt connector tongue 32 and buckle 34 arrangement is shown having electric power circuitry according to a ninth embodiment. In this embodiment, the connector tongue 32 is configured to receive a power connector collar 160 on the outer surface thereof. The collar 160 may be an original equipment or an after-market collar that is configured to slide onto the connector tongue 32 and be held in place therewith. The collar 160 includes a pair of electrical contacts 164A and 164B shown provided on opposite lateral sides of the tongue 32. The buckle 34 includes a pair of receiving pads 166A and 166B which are adapted to align and connect with the contacts 164A and 164B when the connector tongue 32 is latched onto the buckle 34. It should be appreciated that the contacts 164A and 164B provided on the collar 160 may otherwise be configured at different locations and may include other power lines and communication lines, according to further embodiments.

Accordingly, the electrical power circuitry provided on the connector tongue 32 and buckle 34 advantageously allows for electrical power to be transmitted from a power supply to the seat belt webbing 24 to power any of a number of power devices, such as a heater, lights, and other devices. In one embodiment, the vehicle seat belt system 20 advantageously provides for a heated seat belt to enhance occupant heating. The seat belt system 20 may advantageously provide for an electric powered heater provided on the seat belt webbing, according to various embodiments.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle seat belt system comprising:
a seat belt comprising a webbing;
a connector tongue connected to the webbing;
a buckle configured to releasably connect with the tongue;
an electric powered heater connected to the webbing; and
electrical circuitry provided on the connector tongue and the buckle to conduct a voltage supply and ground voltage return between a power source and the heater via contacts on the tongue and the buckle when the tongue is connected to the buckle.

2. The seat belt system of claim 1, wherein the electrical circuitry comprises first circuitry provided on the connector tongue and second circuitry provided on the buckle, wherein the first and second conductive circuitry are electrically connected when the tongue is connected to the buckle.

3. The seat belt system of claim 1, wherein the electric heater comprises a resistance heating element sewn into the webbing.

4. The seat belt system of claim 3, wherein the sewn resistance heating element comprises a resistance wire sewn into the webbing and coupled in parallel between positive and negative bus bars.

5. The seat belt system of claim 3, wherein the resistance heating element comprises a resistance wire sewn into the webbing in series.

6. The seat belt system of claim 1, wherein the webbing comprises a tubular webbing defining a passageway, and wherein the heater is disposed within the passageway.

7. The seat belt system of claim 1, wherein the heater is connected to an outside surface of the webbing.

8. The seat belt system of claim 7 further comprising a dielectric and thermally conductive material disposed on top of the heater.

9. The seat belt system of claim 1, wherein the heater comprises a thermoelectric device that heats or cools the webbing.

10. The seat belt system of claim 9, wherein the webbing comprises a tubular webbing defining a passageway, wherein the thermoelectric device is disposed within the passageway.

11. The seat belt system of claim 10 further comprising an air delivery device for delivering air to the passageway.

12. A vehicle seat belt system comprising:
a seat belt comprising a webbing;
a connector tongue connected to the webbing;
a buckle configured to releasably connect with the tongue;
an electric powered heater connected to the webbing;
electrical circuitry provided on the connector tongue and the buckle to conduct a voltage a supply and ground return when the tongue is connected to the buckle; and
an electric power source for providing electric power to the electric heater via the contacts on the buckle and the tongue in the electrical circuitry.

13. The seat belt system of claim 12, wherein the electric heater comprises a resistance heating element sewn into the webbing.

14. The seat belt system of claim 13, wherein the sewn resistance heating element comprises a resistance wire sewn into the webbing and coupled in parallel between positive and negative bus bars.

15. The seat belt system of claim 13, wherein the resistance heating element comprises a resistance wire sewn into the webbing in series.

16. The seat belt system of claim 12, wherein the webbing comprises a tubular webbing defining a passageway, and wherein the heater is disposed within the passageway.

17. The seat belt system of claim 12, wherein the heater is connected to an outside surface of the webbing.

18. The seat belt system of claim 12, wherein the heater comprises a thermoelectric device that heats or cools the webbing, and wherein the webbing comprises a tubular webbing defining a passageway, wherein the thermoelectric device is disposed within the passageway.

19. A vehicle seat belt system comprising:
a seat belt comprising a tubular webbing defining a passageway;
an electric powered heater disposed within the passageway;
an air delivery device for delivering air to the passageway; and
a power source for providing electric power to the heater.

20. The seat belt system of claim 19, wherein the heater comprises a thermoelectric device that heats or cools the webbing.

* * * * *